(12) United States Patent
Trescases et al.

(10) Patent No.: US 11,959,315 B2
(45) Date of Patent: Apr. 16, 2024

(54) LATCH ASSEMBLY WITH HYBRID BACKUP ENERGY SOURCE

(71) Applicant: Magna Closures Inc., Newmarket (CA)

(72) Inventors: Olivier Trescases, Newmarket (CA); Miad Fard, Newmarket (CA); Vishal Palaniappan, Newmarket (CA)

(73) Assignee: MAGNA CLOSURES INC., Newmarket (CA)

( * ) Notice: Subject to any disclaimer, the term of this patent is extended or adjusted under 35 U.S.C. 154(b) by 240 days.

(21) Appl. No.: 17/604,884

(22) PCT Filed: May 19, 2020

(86) PCT No.: PCT/CA2020/050671
§ 371 (c)(1),
(2) Date: Oct. 19, 2021

(87) PCT Pub. No.: WO2020/232543
PCT Pub. Date: Nov. 26, 2020

(65) Prior Publication Data
US 2022/0195761 A1     Jun. 23, 2022

Related U.S. Application Data

(60) Provisional application No. 62/851,993, filed on May 23, 2019.

(51) Int. Cl.
*E05B 81/86* (2014.01)
*E05B 77/02* (2014.01)
(Continued)

(52) U.S. Cl.
CPC .............. *E05B 81/86* (2013.01); *E05B 77/02* (2013.01); *E05B 81/04* (2013.01); *E05B 81/82* (2013.01);
(Continued)

(58) Field of Classification Search
CPC .......... E05B 81/00; E05B 81/04; E05B 81/05; E05B 81/06; E05B 81/08; E05B 81/80;
(Continued)

(56) References Cited

U.S. PATENT DOCUMENTS 7,261,335 B2    8/2007   Schupp
7,287,785 B2   10/2007   Schupp et al.
(Continued)

FOREIGN PATENT DOCUMENTS

CN    107437846 A    12/2017
CN    107816265 A    3/2018
(Continued)

*Primary Examiner* — Nathan Cumar
(74) *Attorney, Agent, or Firm* — Dickinson Wright PLLC

(57) ABSTRACT

A latch assembly for a closure panel and corresponding method of operation are provided. The assembly includes an actuation group to latch and unlatch the closure panel using power from a main power source during normal operation. A first backup energy source is selectively coupled to the actuation group and stores energy during normal operation and supplies the energy during a failure. A second backup energy source is selectively coupled to the first backup energy source and supplies energy thereto during the failure. A latch controller is coupled to the backup energy sources and detects latch operation and whether there is normal operation. The latch controller charges the first backup energy source using energy from the second backup energy source based on the detection of latch operation and the failure and disconnects the second backup energy source during normal operation to conserve energy stored in the second backup energy source.

11 Claims, 25 Drawing Sheets

(51) Int. Cl.
*E05B 81/04* (2014.01)
*E05B 81/82* (2014.01)
*E05B 83/36* (2014.01)
*H01G 11/12* (2013.01)
*H01M 10/0525* (2010.01)
*H01M 10/44* (2006.01)
*H02J 7/00* (2006.01)
*H02J 7/34* (2006.01)
*H02J 9/06* (2006.01)

(52) U.S. Cl.
CPC ............. *E05B 83/36* (2013.01); *H01G 11/12* (2013.01); *H01M 10/0525* (2013.01); *H01M 10/441* (2013.01); *H02J 7/007182* (2020.01); *H02J 7/342* (2020.01); *H02J 9/06* (2013.01)

(58) Field of Classification Search
CPC .......... E05B 81/82; E05B 81/84; E05B 81/86; E05B 77/00; E05B 77/02; E05B 77/04; E05B 77/06; E05B 83/00; E05B 83/36; E05B 83/363; H02J 7/00; H02J 7/007182; H02J 7/00712; H02J 7/342; H02J 9/00; H02J 9/006; H02J 9/061; H01G 11/00; H01G 11/12; H01M 10/00; H01M 10/0525; H01M 10/44; H01M 10/441
USPC .......................................... 70/277
See application file for complete search history.

(56) References Cited

U.S. PATENT DOCUMENTS

| | | | |
|---|---|---|---|
| 7,642,669 | B2 | 1/2010 | Spurr |
| 7,791,218 | B2* | 9/2010 | Mekky ................ E05B 81/86 307/64 |
| 8,376,416 | B2 | 2/2013 | Arabia, Jr. et al. |
| 9,518,408 | B1* | 12/2016 | Krishnan .............. E05B 81/80 |
| 9,896,866 | B2* | 2/2018 | Bryla ................ E05B 47/0001 |
| 10,378,251 | B2 | 8/2019 | Dente |
| 10,480,222 | B2* | 11/2019 | Funahashi ............. E05B 81/56 |
| 11,053,714 | B2 | 7/2021 | Kageyama et al. |
| 2015/0188345 | A1 | 7/2015 | Sohn et al. |
| 2017/0107747 | A1* | 4/2017 | Dente ................... E05B 81/04 |
| 2017/0341526 | A1* | 11/2017 | Marlia ................ B60L 3/0046 |

FOREIGN PATENT DOCUMENTS

| | | |
|---|---|---|
| CN | 107873009 A | 4/2018 |
| CN | 109490787 A | 3/2019 |
| DE | 20121915 U1 | 10/2003 |
| EP | 0856625 A1 | 8/1998 |
| JP | 2000064685 A | 2/2000 |
| JP | 2001303821 A | 10/2001 |
| JP | 2008005662 A | 1/2008 |
| WO | 2015015258 A2 | 2/2015 |
| WO | 2020222024 A1 | 11/2020 |
| WO | 2023169618 A1 | 9/2023 |

* cited by examiner

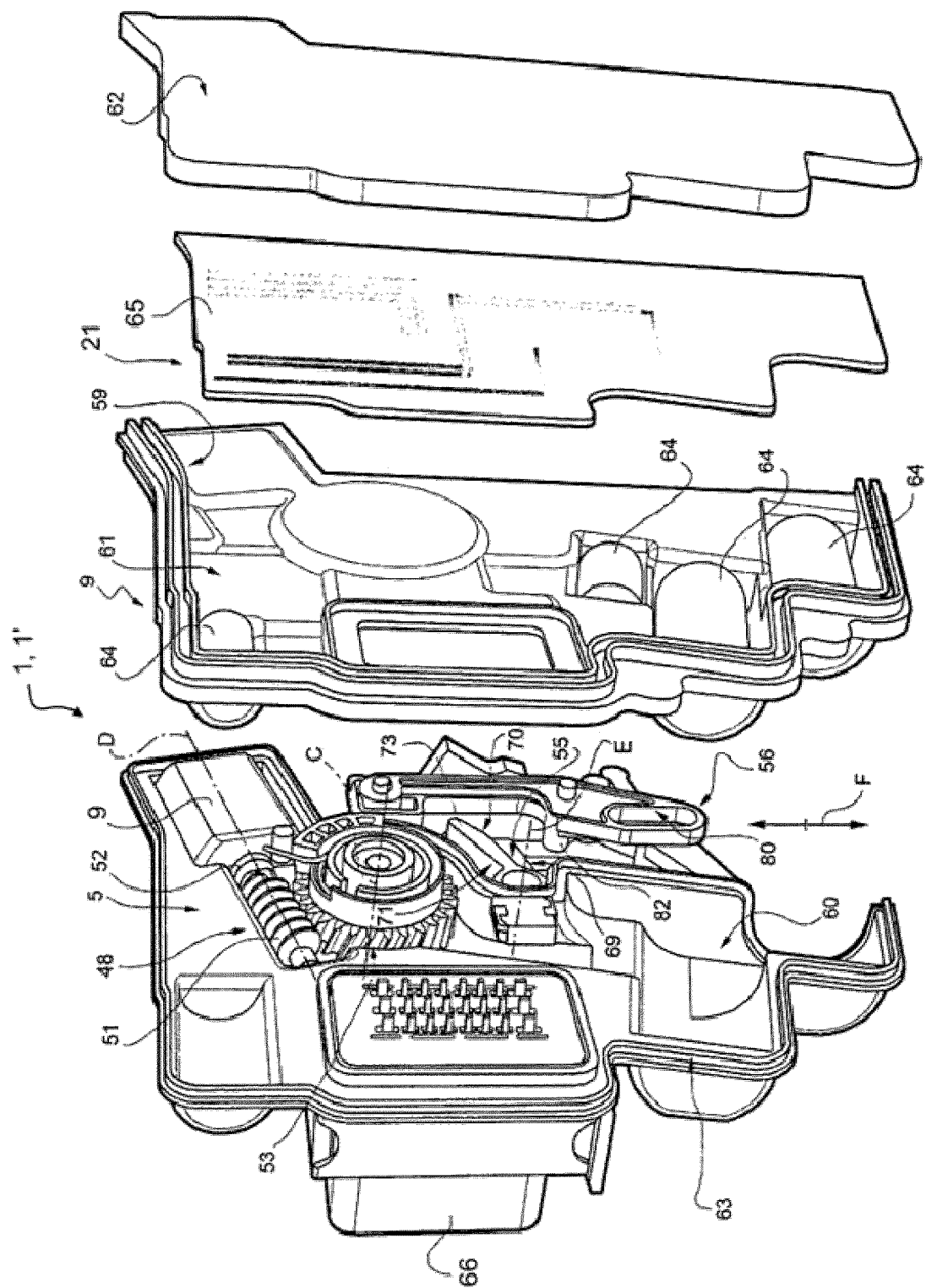

LATCH ASSEMBLY WITH HYBRID BACKUP ENERGY SOURCE

CROSS-REFERENCE TO RELATED APPLICATIONS

This application is a U.S. National Stage of PCT International Application No. PCT/CA2020/050671 filed May 19, 2020, which claims the benefit of U.S. Provisional Application No. 62/851,993 filed May 23, 2019. The entire disclosure of each of the above applications being considered part of the disclosure of this application and hereby incorporated by reference in their entirety.

FIELD

The present disclosure relates generally to an electrical latch assembly for a vehicle door, in particular to a latch assembly with a hybrid backup energy source and method of operating the latch assembly.

BACKGROUND

This section provides background information related to the present disclosure which is not necessarily prior art.

It is desirable to have electrically activated latch assemblies in motor vehicles; however one problem with such electrically activated side door latch assemblies is they lack the ability to have the latch be activated (e.g., unlatched) to release and open the side door in a failure mode. Such failure modes may arise if the motor vehicle is in an accident and, for example, a power cable connecting a battery or other main power source to the electrically activated latch assembly is severed or damaged preventing the latch from operating correctly. In other situations, the main vehicle battery may have been depleted, for example, as a result of remaining in storage for an extended period of time. Thus, the main battery power may be insufficient to power operation of the latch correctly. Additionally, the loss or depletion of the main power source in a vehicle with electrically activated latch assemblies can lead to difficulty accessing the vehicle (e.g., opening a side door to gain access to a hood release) in order to remedy a loss or deficiency of the main power source.

To avoid these situations, the latch typically has a mechanical release which serves as a backup to the electrically activated latch assembly. Such a redundant mechanical release may act as a backup to the electrically activated latch assembly, but adds weight and assembly costs and further limits the design of the door or other closure panel. Accordingly, there remains a need for improved latch assemblies used in door modules with corresponding methods of operation thereof that eliminate the need for the mechanical release.

SUMMARY

This section provides a general summary of the present disclosure and is not a comprehensive disclosure of its full scope or all of its features and advantages.

An object of the present disclosure is to provide a latch assembly and a method of operating the latch assembly that address and overcome the above-noted shortcomings.

Accordingly, it is an aspect of the present disclosure to provide a latch assembly for a closure panel of a motor vehicle. The latch assembly includes at least one actuation group being movable to latch and unlatch the closure panel using power from a main power source during a normal operating condition. A first backup energy source is selectively coupled to the at least one actuation group and configured to store energy during the normal operating condition and to supply the energy to the at least one actuation group during a failure operating condition different from the normal operating condition. A second backup energy source is selectively coupled to the first backup energy source and is configured to supply energy to the first backup energy source during the failure operating condition. An electronic control circuit that has a latch controller is coupled to the at least one actuation group and to the first backup energy source and the second backup energy source. The latch controller is configured to detect one of a latch request and a completed latch operation and detect whether there is one of the normal operating condition and the failure operating condition. The latch controller is configured to charge the first backup energy source using energy from the second backup energy source based on the detection of the one of the latch request and the completed latch operation and the failure operating condition. The latch controller additionally disconnects the second backup energy source from the first backup energy source during normal operating condition to conserve energy stored in the second backup energy source.

According to another aspect of the disclosure, another latch assembly for a closure panel of a motor vehicle is provided. The latch assembly includes a motor being movable to latch and unlatch the closure panel using power from a main power source during a normal operating condition. A first backup energy source is selectively coupled to the motor and configured to store energy during the normal operating condition and to supply the energy to the motor during a failure operating condition different from the normal operating condition. A second backup energy source is configured to supply energy to the first backup energy source during the failure operating condition. A first boost converter is coupled between the second backup energy source and the first backup energy source. An electronic control circuit that has a latch controller is coupled to the first backup energy source and the second backup energy source and the first boost converter. The latch controller is configured to detect a latch request and detect whether there is one of the normal operating condition and the failure operating condition. The latch controller is configured to boost a voltage from the second backup energy source to charge the first backup energy source using the first boost converter during the failure operating condition. The latch controller couples the first backup energy source to the motor to boost a voltage of the first backup energy source to drive the motor in response to detecting the failure operating condition.

According to another yet aspect of the disclosure, a method of operating method of operating a latch assembly of a closure panel is also provided. The method includes the step of detecting whether there is one of a normal operating condition wherein a main power source is available and a failure operating condition wherein the main power source is not available. Next, the method includes disconnecting a first backup energy source from at least one actuation group being movable to latch and unlatch the closure panel in response to detecting the failure operating condition. The method also includes the steps of connecting a second backup energy source to a first boost converter and connecting the first boost converter to the first backup energy source to charge the first backup energy source to an intermediate voltage level lower than a full charge using energy from the second backup energy source. The method continues by detecting a latch request and connecting the first boost converter to the second backup energy source to charge the first backup energy source in response to detecting the latch request. The next step of the method is connecting the first backup energy source to a second boost converter and disconnecting the first backup energy source from the first boost converter. The method continues with the step of returning to the step of connecting the first boost converter to the second backup energy source to charge the first backup energy source. The method proceeds by connecting the second boost converter to the at least one actuation group and controlling the at least one actuation group to carry out the latch request. The method also includes the step of disconnecting the first backup energy source from the second boost converter. The method additionally includes the steps of detecting a completed latch operation and connecting the first boost converter to the first backup energy source to charge the first backup energy source to the intermediate voltage level using energy from the second backup energy source in response to detecting the completed latch operation.

According to an additional aspect of the disclosure, another method of operating a latch assembly of a closure panel is provided. The method includes the step of detecting whether there is one of a normal operating condition wherein a main power source is available and a failure operating condition wherein the main power source is not available. The method proceeds with the steps of detecting a latch request in response to detecting the failure operating condition and determining whether a predetermined period of time has elapsed in response to not detecting a latch request. The method then includes the step of disconnecting a second backup energy source from a first boost converter to implement a deep sleep mode in response to the predetermined period of time being elapsed. The method also includes the steps of detecting a completed latch operation and connecting a first boost converter to a first backup energy source to charge the first backup energy source to an intermediate voltage level using energy from the second backup energy source in response to detecting the completed latch operation. The next steps of the method are determining whether the predetermined period of time has elapsed and returning to the step of connecting the first boost converter to the first backup energy source to charge the first backup energy source to the intermediate voltage level using energy from the second backup energy source in response to the predetermined period of time not being elapsed. The method then includes the step of disconnecting the second backup energy source from the first boost converter to implement the deep sleep mode in response to the predetermined period of time being elapsed.

According to another aspect of the disclosure, there is provided a latch assembly for a closure panel of a motor vehicle. The latch assembly includes at least one actuation group being movable to latch and unlatch the closure panel using power from a main power source during a normal operating condition. A first backup energy source is selectively coupled to the at least one actuation group and is configured to store energy during the normal operating condition and to supply the energy to the at least one actuation group during a failure operating condition different from the normal operating condition. A second backup energy source is selectively coupled to the first backup energy source and is configured to supply energy to the first backup energy source during the failure operating condition. The latch assembly also includes an electronic control circuit having a latch controller coupled to the at least one actuation group and to the first backup energy source and the second backup energy source. The electronic control circuit is configured to detect whether there is one of the normal operating condition and the failure operating condition. The electronic control circuit is also configured to charge the first backup energy source using energy from the second backup energy source based on the detection of the failure operating condition, wherein the first backup energy source is charged to maintain the voltage of the first backup energy source within a predetermined voltage range.

According to another aspect of the disclosure, there is provided a latch assembly for a closure panel of a motor vehicle. The latch assembly includes a latch electric motor being movable to latch and unlatch the closure panel using power from a main power source during a normal operating condition. The latch assembly also includes a first backup energy source selectively coupled to the latch electric motor and configured to store energy during the normal operating condition and to supply the energy to the latch electric motor during a failure operating condition different from the normal operating condition. A second backup energy source is configured to supply energy to the first backup energy source during the failure operating condition. An electronic control circuit having a latch controller is coupled to the first backup energy source and the second backup energy source and is configured to detect whether there is one of the normal operating condition and the failure operating condition. The electronic control circuit also disconnects the second backup energy source from the first backup energy source during normal operating condition to conserve energy stored in the second backup energy source and connects the second backup energy source to the first backup energy source in response to detecting the failure operating condition.

According to another aspect, there is provided a method of operating a latch assembly of a closure panel. The method includes the step of detecting whether there is one of a normal operating condition wherein a main power source is available and a failure operating condition wherein the main power source is not available. The method continues by disconnecting a first backup energy source from at least one actuation group being movable to latch and unlatch the closure panel in response to detecting the failure operating condition. Next, connecting a second backup energy source to the first backup energy source in response to detecting the failure operating condition to maintain the voltage of the first backup energy source within a predetermined voltage range.

According to another aspect, there is provided a method of operating a latch assembly of a closure panel. The method includes the step of detecting whether there is one of a normal operating condition wherein a main power source is available and a failure operating condition wherein the main power source is not available. Next, connecting a second backup energy source to a first backup energy source in response to detecting the failure operating condition to maintain the voltage of the first backup energy source within a predetermined voltage range. The method continues with the steps of detecting a latch request and determining whether a predetermined period of time has elapsed in response to one of not detecting the latch request and detecting the failure operating condition. The next step of the method is disconnecting the second backup energy source from the first backup energy source to implement a deep sleep mode in response to the predetermined period of time being elapsed.

According to another aspect, there is provided a latch assembly for a closure panel of a motor vehicle. The latch assembly includes at least one actuation group being movable to latch and unlatch the closure panel using power from a main power source during a normal operating condition. A first backup energy source is selectively coupled to the at least one actuation group and is configured to store energy during the normal operating condition and to supply the energy to the at least one actuation group during a failure operating condition different from the normal operating condition. A second backup energy source is selectively coupled to the first backup energy source and is configured to supply energy to the first backup energy source during the failure operating condition. The latch assembly also includes an electronic control circuit having a latch controller coupled to the at least one actuation group and to the first backup energy source and the second backup energy source. The electronic control circuit is configured to detect whether there is one of the normal operating condition and the failure operating condition. The electronic control circuit is also configured to determine whether a predetermined period of time has elapsed after detecting the failure operating condition and disconnect the second backup energy source from the first backup energy source to implement a deep sleep mode in response to the predetermined period of time being elapsed.

According to another aspect, there is provided a latch assembly for a closure panel of a motor vehicle. The latch assembly includes at least one actuation group being movable to latch and unlatch the closure panel using power from a main power source during a normal operating condition. A first backup energy source is selectively coupled to the at least one actuation group and is configured to store energy during the normal operating condition and to supply the energy to the at least one actuation group during a failure operating condition different from the normal operating condition. A second backup energy source is selectively coupled to the first backup energy source and is configured to supply energy to the first backup energy source during the failure operating condition. The latch assembly additionally includes an electronic control circuit that has a latch controller coupled to the at least one actuation group and to the first backup energy source and the second backup energy source. The electronic control circuit is configured to detect whether there is one of the normal operating condition and the failure operating condition and detect a voltage of the first backup energy source below a lower voltage threshold level. The electronic control circuit is also configured to charge the first backup energy source to an upper voltage threshold level using energy from the main power source based on the detection the normal operating condition in response to detecting the voltage of the first backup energy source below a lower voltage threshold level. In addition, the electronic control circuit is configured to detect a voltage of the second backup energy source below the lower voltage threshold level and charge the second backup energy source to level to an upper voltage threshold level using energy from the second backup energy source based on the detection the failure operating condition in response to detecting the voltage of the first backup energy source below a lower threshold.

In accordance with a related aspect of the latch assembly, the latch assembly further includes a second backup switch coupled between the second backup energy source and the first backup energy source and controlled by the latch controller for coupling and decoupling the second backup energy source from the first backup energy source. The latch assembly also includes a first backup switch coupled between the first backup energy source and main power source and controlled by the latch controller for coupling and decoupling the first backup energy source from the main power source.

In accordance with a related aspect of the latch assembly, the latch assembly further includes a controller further configured to stop charging the second backup energy source in response to detecting the voltage of the second backup energy source at or above the upper voltage threshold level, and charge the second backup energy source to the upper voltage threshold level using energy from the second backup energy source in response to detecting the voltage of the first backup energy source at or below the lower voltage threshold level.

In accordance with a related aspect of the latch assembly, the latch assembly further includes a first boost converter coupled to the first backup energy source and the second backup energy source. The first boost converter is controlled by the latch controller in a burst mode to increase a voltage from the second backup energy source to charge the first backup energy source.

In accordance with a related aspect of the latch assembly, the latch assembly further includes a second boost converter coupled to a main positive terminal of the main power source and to the first backup energy source. The second boost converter controlled by the latch controller in a buck mode to reduce a battery voltage from the main power source to charge the first backup energy source.

In accordance with a related aspect of the latch assembly, the upper voltage threshold level of the second backup energy source is one of a partial charge and a full charge level.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is an exploded side perspective view of a part of the latch assembly of FIGS. 1 and 2 according to aspects of the disclosure;

Figure 25:
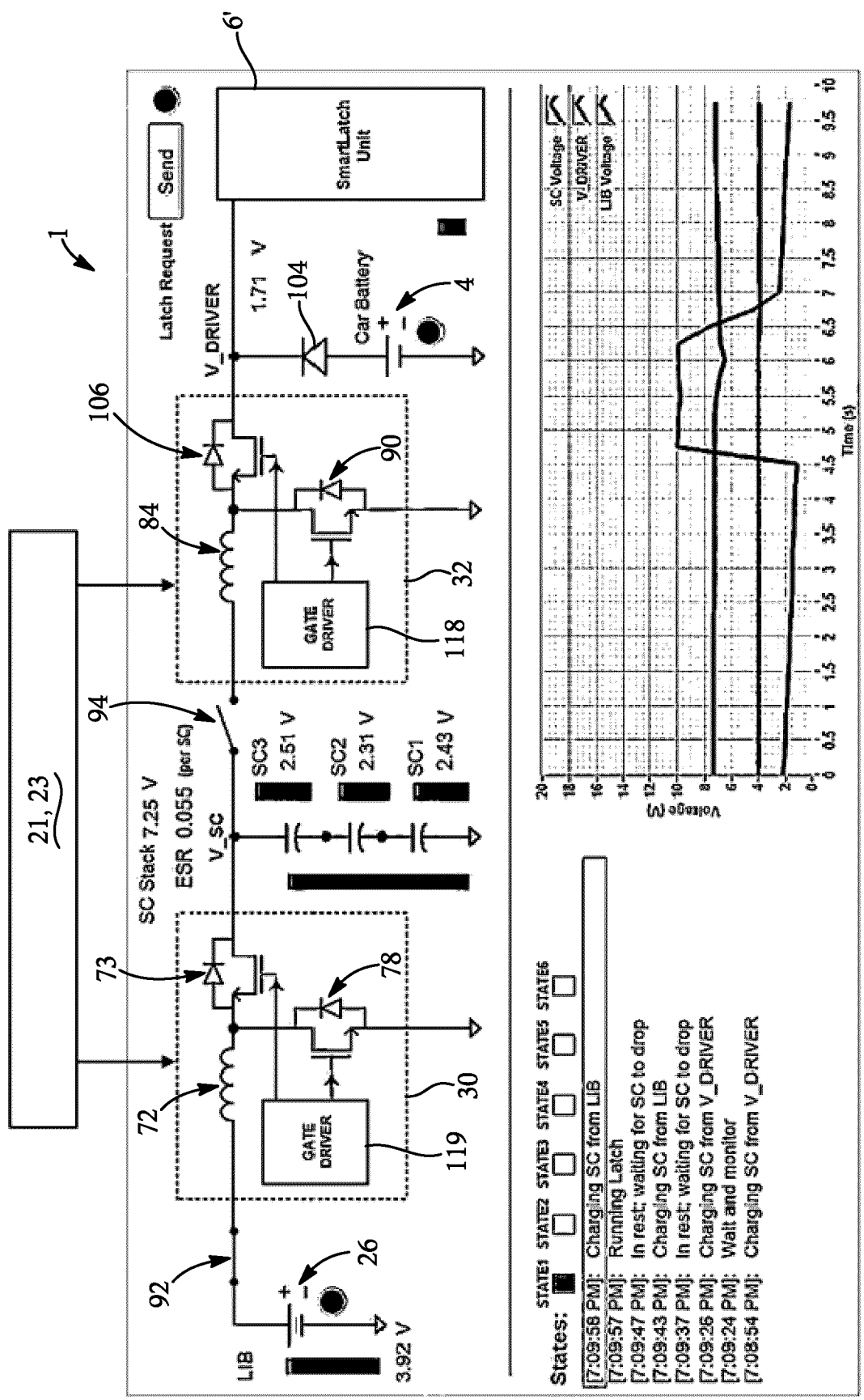
Figure 26:
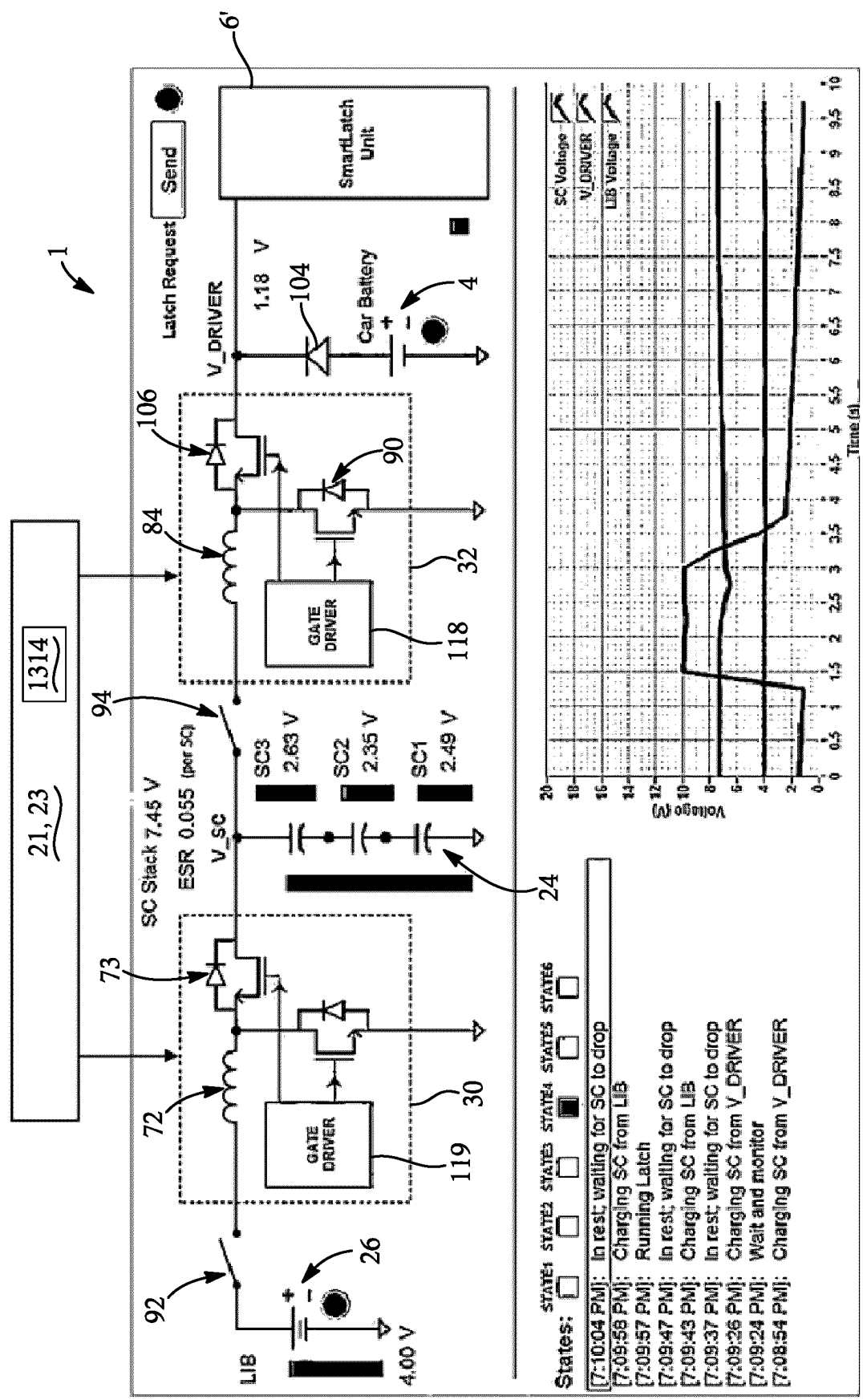

FIG. 25 illustrates a sequence of operation for the first exemplary embodiment of the latch assembly with the dual boost converter configuration in first state and the second state while the main power source is not available according to aspects of the disclosure; and FIG. 26 illustrates a sequence of operation for the first exemplary embodiment of the latch assembly with the dual boost converter configuration in first state and the second state while the main power source is not available according to aspects of the disclosure.

DETAILED DESCRIPTION

In the following description, details are set forth to provide an understanding of the present disclosure. In some instances, certain circuits, structures and techniques have not been described or shown in detail in order not to obscure the disclosure.

In general, the present disclosure relates to a latch assembly of the type well-suited for use in many applications. The latch assembly and associated methods of operation of this disclosure will be described in conjunction with one or more example embodiments. However, the specific example embodiments disclosed are merely provided to describe the inventive concepts, features, advantages and objectives with sufficient clarity to permit those skilled in this art to understand and practice the disclosure. Specifically, the example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
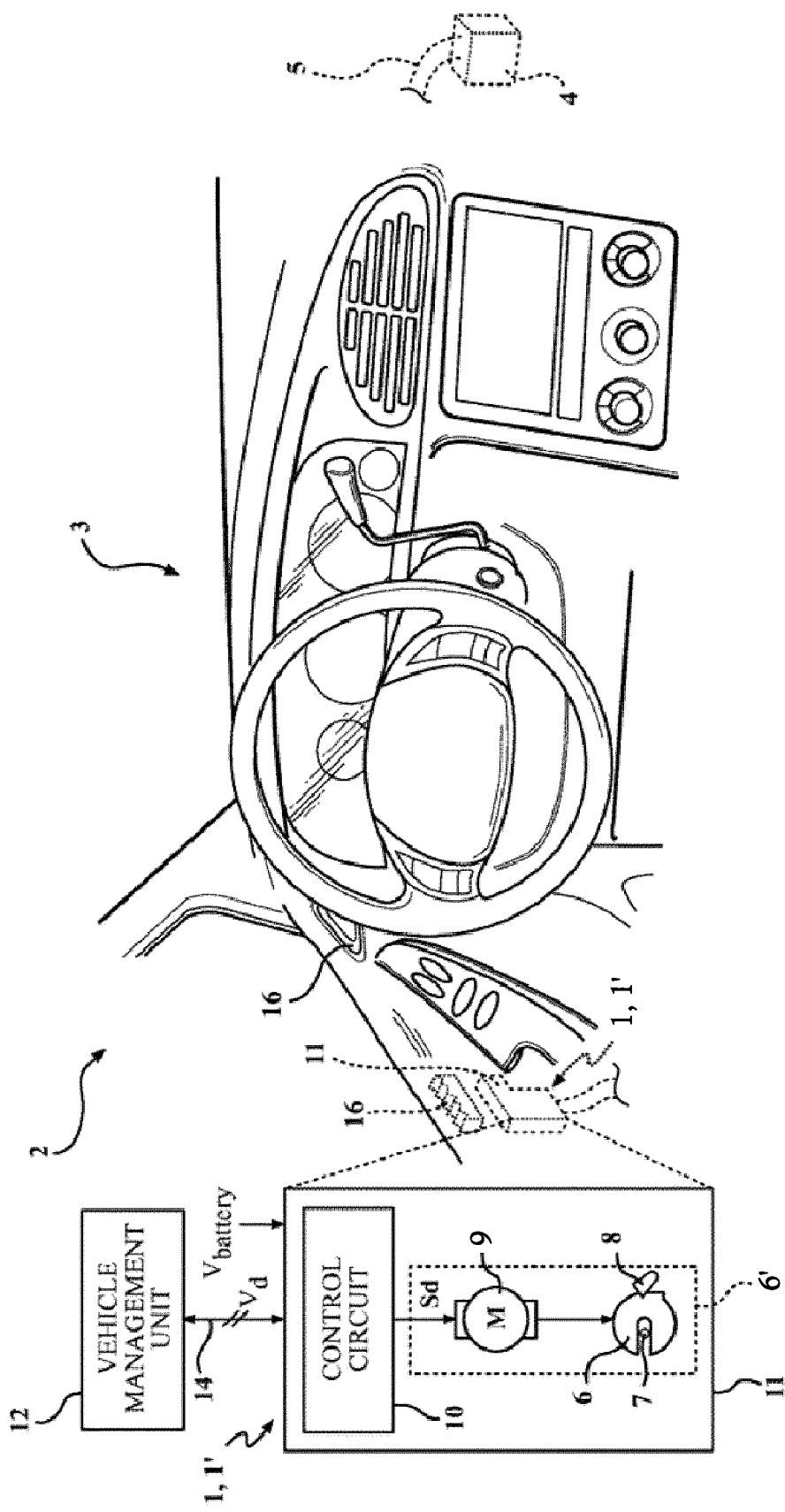
FIG. 1 is a schematic representation of a motor vehicle with a closure panel and a latch assembly according aspects of the disclosure.

As best shown in FIG. 1, a latch assembly 1, 1', referred to as a "Smart Latch" or e-latch, is coupled to a closure panel (e.g., side door 2) of a motor vehicle 3. However, it should be understood that the latch assembly 1, 1' may equally be coupled to any kind of closure device or panel of the motor vehicle 3. The latch assembly 1, 1' is electrically connected to a main power source 4 of the motor vehicle 3, for example a main battery providing illustratively a battery voltage Vbatt of 12 V, through an electrical connection element 5, for example a power cable (the main power source 4 may equally include a different source of electrical energy within the motor vehicle 3, for example an alternator).

The latch assembly 1, 1' includes at least one actuation group 6' disposed within the latch housing 11, including a latch electric motor 9 operable to control actuation of the door 2 (or in general of the closure panel to latch and unlatch the closure panel). Latch electric motor 9 is an illustrative example of a motor for driving actuation of a component of a closure member, such as a latch assembly 1, 1'. Other types of components having a motor include but are not limited to, a window regulator motor, a door presenter motor, a power actuator motor, a cinch motor, a deployable handle motor, a mirror motor, a gesture or access system, an identify authentication system (e.g. a passive keyless entry (PKE) system), a user interface such as a keypad or interface, and the like without limitation. As shown, the at least one actuation group 6' includes a ratchet 6, which is selectively rotatable to engage a striker 7 (fixed to the body of the motor vehicle 3, for example to the so called "A pillar" or "B pillar", in a manner not shown in detail). When the ratchet 6 is rotated into a latching position with respect to the striker 7 (i.e., a primary position of the ratchet 6), the side door 2 is in a closed operating state. A pawl 8 selectively engages the ratchet 6 to prevent it from rotating, driven by the latch electric motor 9, so as to move between an engaged position and a non-engaged position, thereby providing a power release function. An additional electrical motor, or same electrical motor may be provided to provide other latch functions other than a power release function, for example the ratchet 6 may also be driven by an electrical motor in order to cinch the door 2 relative to the motor vehicle 3, and for example the ratchet 6 may also be driven by an electrical motor in order to present the door 2 relative to the motor vehicle 3.

The latch assembly 1, 1' further includes an electronic control circuit 10, which may be conveniently embedded and arranged in a latch housing 11 (shown schematically) with the at least one actuation group 6' of the latch assembly 1, 1', thus providing an integrated compact and easy-to-assemble unit.

The electronic control circuit 10 is coupled to the latch electric motor 9 of the at least one actuation group 6' and provides driving signals Sd thereto. The electronic control circuit 10 may also be electrically coupled to a main vehicle management unit 12 (also known as main ECU or "vehicle body computer" or Body Control Module or BCM), which is configured to control general operation of the motor vehicle 3, via a data bus 14, so as to exchange signals, data, commands and/or information.

Figure 2:
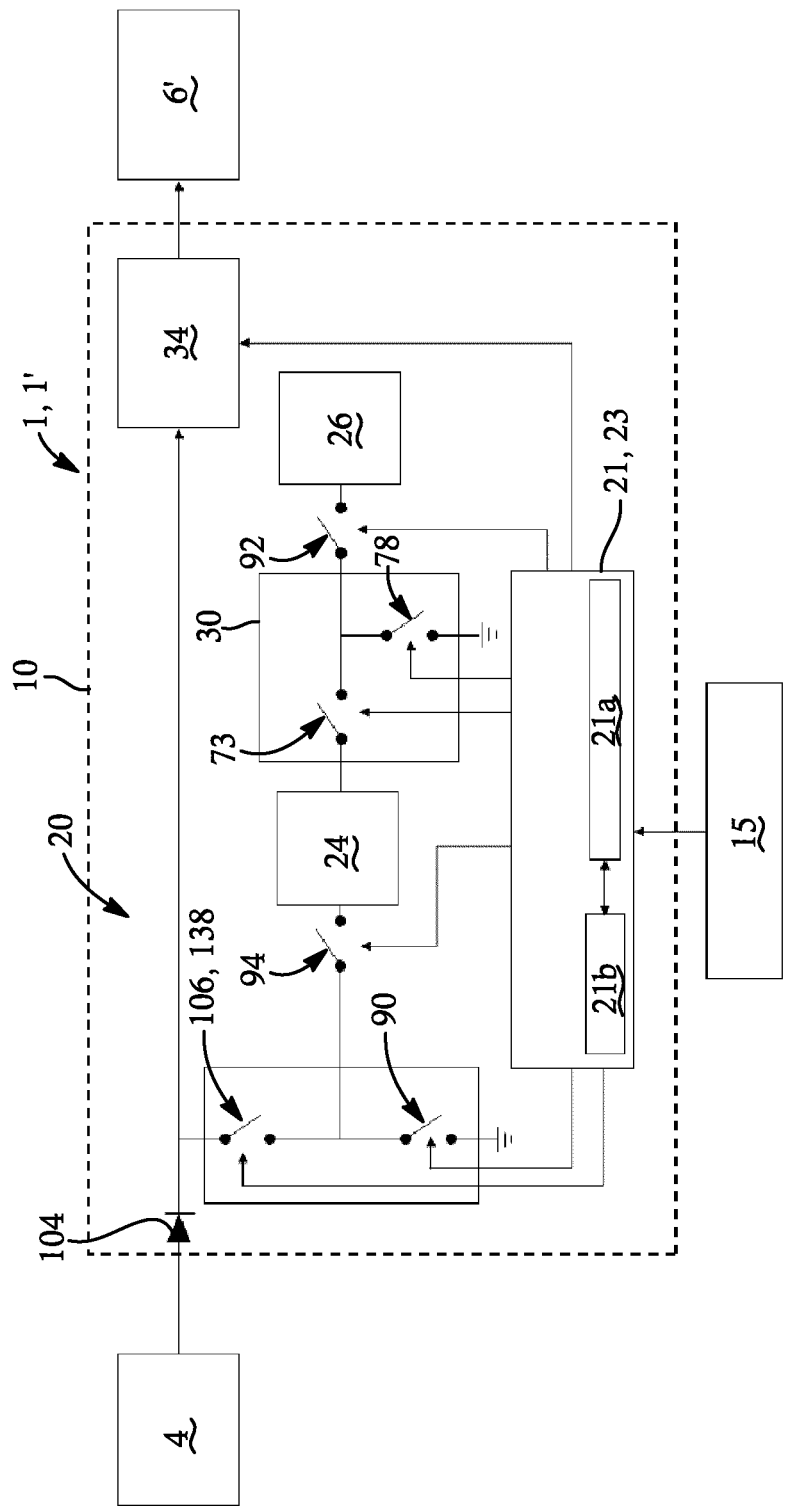
FIG. 2 is a general block diagram of an electronic control circuit of the latch assembly of FIG. 1 according to aspects of the disclosure.

Moreover, as best shown in FIG. 2, the electronic control circuit 10 is (directly, and/or indirectly via the vehicle management unit 12) coupled to a plurality of sensors 15 of the motor vehicle 3, such as: a key-fob signal, handle-reading sensors (which read actuation of external and/or internal handles 16), crash sensors, lock switch sensors, and the like; conveniently, the electronic control circuit 10 also receives feedback information about the latch actuation from position sensors (not shown), such as Hall sensors, configured to detect the operating position, for example of the ratchet 6 and/or pawl 8.

The electronic control circuit 10 is also coupled to the main power source 4 (e.g., vehicle battery) of the motor vehicle 3, so as to receive the battery voltage Vbatt; the electronic control circuit 10 is thus able to check if the value of the battery voltage Vbatt decreases below a predetermined threshold value, to promptly determine if an emergency or crash condition or battery main failure or power line failure (when a backup energy source subassembly 20 may be needed) occurs. The electronic control circuit 10 includes the backup energy source subassembly 20 (e.g., within the latch assembly 1, 1'), which is configured to supply electrical energy (Vload) to the actuation group 6' and latch electric motor 9, and to the electronic control circuit 10, in case of failure or interruption of the main power supply from the main power source 4 of the motor vehicle 3. Backup energy source subassembly 20 may also be provided remote from the latch assembly 1, 1', and in other locations. For example backup energy source subassembly 20 may be provided in the vehicle door cavity, for example mounted to a door module.

In more detail, the electronic control circuit 10 includes a latch controller 21 for example provided with a microcontroller, microprocessor or analogous computing module 21a, coupled to the backup energy source subassembly 20 and the actuation group 6' of the latch assembly 1, 1', to control their operation. The electronic control circuit 10 also includes an output module or driver circuit, such as H-bridge module 27. It should be understood that the output module may be an integrated circuit, be constructed of discrete components, or even integrated with other elements of the electronic control circuit 10. A main power diode 104, 144 is connected in between the main power source 4 and the backup energy source subassembly 20 to ensure current only flows away from the main power source 4 (for example, its cathode terminal is connected to the backup energy source subassembly 20 and its anode terminal is connected to the main power source 4 for receiving Vbatt).

The latch controller 21 has an embedded memory 21b, for example a non-volatile random access memory 21b, coupled to the computing module 21a, storing suitable programs and computer instructions (for example in the form of a firmware) encompassing algorithms for execution by the computing module 21a of the motor monitoring and control methods and techniques as described herein. For example, instructions and code stored on the embedded memory 21b may also be related to various system modules, for example application programming interfaces (API) modules, drive API, digital input output API, Diagnostic API, Communication API, and communication drivers for LIN communications and CAN bus communications with a body control module (BCM) or other vehicle systems. While modules or units may be described as being loaded into the embedded memory 21b, it is understood that the modules or units could be implemented in hardware and/or software. It is recognized that the latch controller 21 may alternatively comprise a logical circuit of discrete components to carry out the functions of the computing module 21a and memory 21b.

As will be discussed in more detail hereinafter, the backup energy source 20 further includes a first backup energy source 24 selectively coupled to the at least one actuation group 6' and configured to store energy during the normal operating condition and to supply the energy to the at least one actuation group 6' during a failure operating condition different from the normal operating condition. The term "selectively coupled" is used herein for example to describe a coupling which can be controlled as desired, and for example as controlled by the latch controller 21 in response to the execution of such programs and computer instructions encompassing algorithms for execution described herein.

According to an aspect, the first backup energy source 24 includes a group of low voltage ultracapacitors or supercapacitors 24 (hereinafter supercapacitors or supercap group), as an energy supply unit (or energy tank) to provide power backup to the latch assembly 1, 1' even in case of power failures. For example supercapacitors 24 may be provided as a supercapacitors stack having three 3 to 5 Farad supercapacitors, as but a non-limiting example. Supercapacitors may include electrolytic double layer capacitors, pseudocapacitors or a combination thereof. While the first backup energy source 24 can include the supercap group, it should be appreciated that the first backup energy source 24 can include a battery or other energy storage device. The first backup energy source 24 may provide a rapid and high power discharge of stored energy.

Supercapacitors advantageously provide high energy density, high output current capability and have no memory effects; moreover, supercapacitors have small size and are easy to integrate, have extended temperature range, long lifetime and may withstand a very high number of charging cycles. Supercapacitors are not toxic and do not entail explosive or fire risks, thus being suited for hazardous conditions, such as for automotive applications.

The backup energy source subassembly 20 of the latch assembly 1, 1' additionally includes a second backup energy source 26 selectively coupled to the first backup energy source 24 and configured to supply energy to the first backup energy source 24 during the failure operating condition. According to one aspect, the second backup energy source 26 is a lithium ion battery; however, it should be appreciated that other energy sources may alternatively be selected for the second backup energy source 26. In another aspect, the second backup energy source 26 is a non-rechargeable lithium ion battery. In another aspect, the second backup energy source 26 is a rechargeable lithium ion battery. The second backup energy source 26 may, for example, be a type of long term high density energy storage device. Thus, in combination, the first backup energy source 24 and the second backup energy source 26 can comprise a hybrid backup energy source 28. Specifically, the supercapacitors 24 can be relatively high power, with low equivalent series resistance (ESR) and the lithium battery 26 can have a relatively high energy density. The supercapacitors 24 can provide rapid power discharge and the lithium battery 26 can have a long term charge maintaining capacity.

So, the latch assembly 1, 1' includes the latch controller 21 coupled to the at least one actuation group 6' and to the first backup energy source 24 and the second backup energy source 26. A first boost converter 30 is coupled between the second backup energy source 26 and the first backup energy source 24 and is also coupled to the latch controller 21. A second boost converter 32 is coupled to the latch controller 21. The first boost converter 30 and second boost converter 32 may be synchronous and bi-directional to allow for both the first backup energy source 24 and the second backup energy source 26 to be charged from the main power source 4, for example during a normal operating condition, by passing negative current through the first boost converter 30 and second boost converter 32. For example, negative current may be passed through the second boost converter 32 from the main power source 4 to the first backup energy source 24 to recharge the first backup energy source 24, and negative current may be passed through the first boost converter 30 from the first backup energy source 24 to the second backup energy source 26 to recharge the second backup energy source 26.

The second boost converter 32 thus provides at its output (that is also the output of the backup energy source 20) a boosted voltage Vload, as a function of the supercap voltage. The boosted voltage Vload is then received by an output module of the electronic control circuit 10, for example the integrated H-bridge module 34, whose output drives the latch electric motor 9 of the at least one actuation group 6'.

FIG. 3 illustrates an exploded side perspective view of a part of the latch assembly 1, 1' of FIGS. 1 and 2. The latch housing 11 of the latch assembly 1, 1' internally houses, in a fluid-tight manner, latch electric motor 9, worm gear 51 and gear wheel 53; the other components of the latch assembly, e.g., sector gear 55 and actuating lever 56, are all externally carried by latch housing 11. Gear wheel 53 is fitted onto a common shaft of axis C, externally protruding, in a fluid-tight manner, from latch housing 11. In practice, worm gear 51 and gear wheel 53 define a first transmission 48 housed, in a fluid-tight manner, inside latch housing 11 and directly driven by latch electric motor 9.

The latch housing 11 has a sandwich structure and defines two distinct chambers 59, 60, one of which (chamber 59) houses, in a fluid-tight manner, latch controller 21 and the other one (chamber 60) houses, in a fluid-tight manner, latch electric motor 9 and transmission 48, e.g., worm gear 51 and gear wheel 53. More specifically, latch housing 11 comprises a central plate 61 and two cover elements 62, 63, arranged on opposite sides of plate 61 and peripherally coupled thereto in a fluid-tight manner to define the opposite chambers 59, 60.

Chamber 59 houses a printed circuit board 65 and a plurality of capacitors 64 connected to printed circuit board 65 and including latch controller 21 and other elements of the electronic control circuit 10. Cover element 63 delimits, with plate 61, chamber 60 and carries externally gear wheel 54, sector gear 55 and actuating lever 56.

Plate 61 defines a plurality of seats for capacitors 64; the connection of the capacitors 64 to the printed circuit board 65 is made for example by press-fit connectors, known per se and not shown. Cover element 62 defines a plurality of seats for latch electric motor 9, worm gear 51 and gear wheel 53, which are closed on the opposite side by plate 61. Cover element 62 also houses an electric connector 66 for connecting electronic control circuit 10 to an electrical system of the motor vehicle 3 (e.g., to the BCM 12).

Latch electric motor 9 is housed in the portion of cover element 62 defining the upper part of latch housing 11; gear wheel 53, sector gear 55 and actuating lever 56 are all arranged inferiorly with respect to latch electric motor 9. Latch electric motor 9 and worm gear 51 have an axis D orthogonal to axis C. Latch electric motor 9 and worm gear 51 are rotated in opposite directions to perform a release function and a reset function respectively for moving the pawl 8 between a ratchet released position and a ratchet holding position respectively. Gear wheel 53 is mounted for rotation about axis C and receive actuation forces from worm gear 51; in greater detail, gear wheel 53 is driven by worm gear 51.

Sector gear 55 is mounted for rotation about a fixed pin having an axis E parallel to axis C and spaced therefrom. Sector gear 55 further comprises three cam surfaces 69, 70, 71 for interacting with actuating lever 56. Cam surface 70 acts in the same direction as cam surface 69 and is adapted to cooperate with actuating lever 56 to move the latter along a release stroke. In particular, sector gear 55 is rotated by latch electric motor 9, worm gear 51 and gear wheel 53 about axis E in a primary direction to produce release of a latch, and in a secondary direction, opposite to the first direction, to obtain reset of an auxiliary ratchet to an enabling position, in which the auxiliary ratchet allows closure of the latch by slamming the door 2.

Actuating lever 56 is carried by the latch housing 11 in a displaceable manner along respective longitudinal direction F. Release and reset strokes of actuating lever 56 is defined by opposite movements of such lever 56 along the respective longitudinal direction F.

Figure 4A:
FIGS. 4A and 4B illustrate a printed circuit board of the latch assembly of FIGS. 1 and 2 showing supercapacitors and a lithium ion battery attached to a printed circuit board of the latch assembly according to aspects of the disclosure.
Figure 4B:
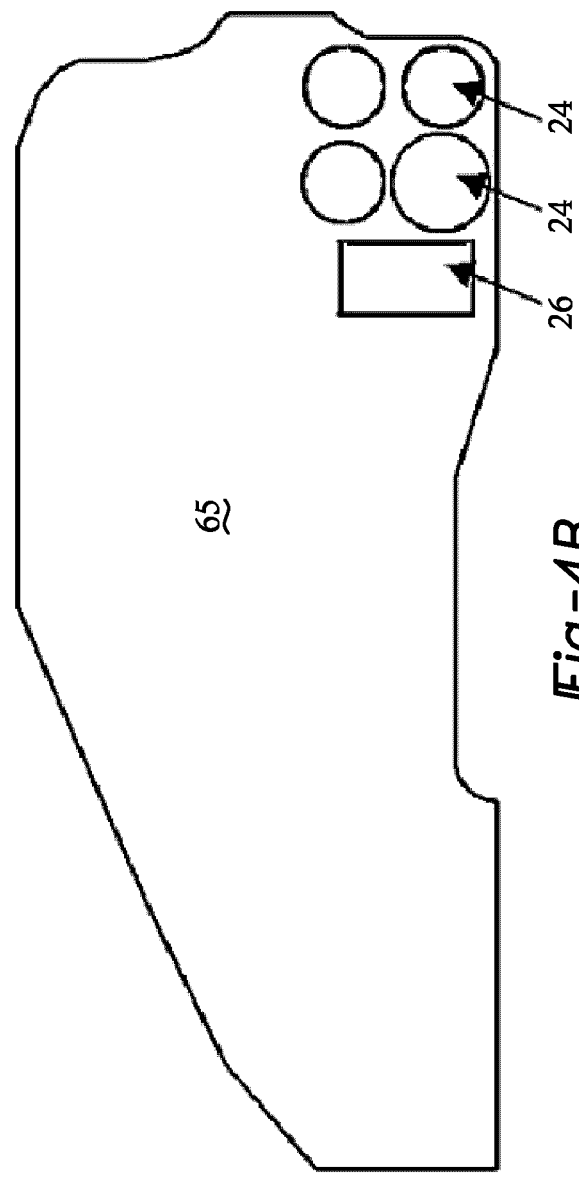

As illustrated in FIGS. 4A and 4B, the supercapacitors 24 and lithium ion battery 26 may be attached to the printed circuit board 65 that is disposed within the latch housing 11. Nevertheless, it should be understood that other arrangements and locations may be alternatively utilized. For example the lithium ion battery 26 may be provided external the latch housing 11, for example disposed within a separate power source housing within closure panel 2, or at another location within the vehicle 3. For example, the lithium ion battery and the supercapacitor may be provided external the latch housing 11.

Figure 5:
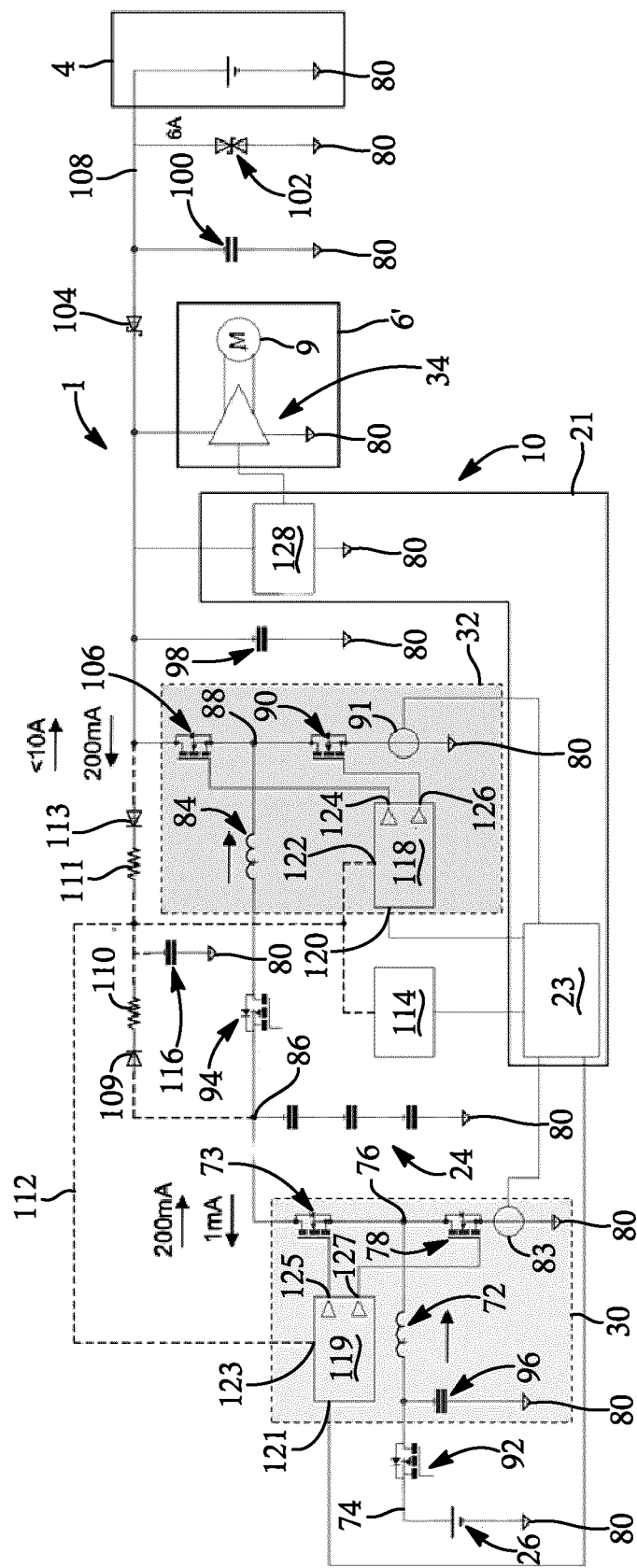
FIG. 5 is a block diagram of a first exemplary embodiment of a latch assembly for the closure panel of the motor vehicle of FIG. 1 according to aspects of the disclosure.

As best shown in FIG. 5, a first exemplary embodiment of a latch assembly 1 for the closure panel 2 of the motor vehicle 3 is provided. Again, the latch assembly 1 includes the at least one actuation group 6' being movable to latch and unlatch the closure panel 2 using power from the main power source 4 during a normal operating condition. The latch assembly 1 also includes the first backup energy source 24 (e.g., the supercapacitors) selectively coupled to the at least one actuation group 6'. The first backup energy source 24 is configured to store energy during the normal operating condition and to supply the energy to the at least one actuation group 6' during a failure operating condition different from the normal operating condition (e.g., the emergency or crash condition as discussed above). The first backup energy source 24 may also be configured to store energy during the failure operating condition in a manner as will be described herein below. The latch assembly 1 additionally includes the second backup energy source 26 (e.g., the lithium ion battery) selectively coupled to the first backup energy source 24 and configured to supply energy to the first backup energy source 24 during the failure operating condition. The latch assembly 1 additionally includes the electronic control circuit 10 that has the latch controller 21 coupled to the at least one actuation group 6' and to the first backup energy source 24 and the second backup energy source 26.

As shown, the first boost converter 30 is coupled between the second backup energy source 26 and the first backup energy source 24. Specifically, the first boost converter 30 includes a first inductor 72 coupled between a second backup positive terminal 74 and the second backup energy source 26 and a first boost node 76. A first boost switch 78 is coupled between the first boost node 76 and an electrical ground 80. As shown, the latch controller 21 can sample the low side current of the first boost switch 78 using the first current probe 83.

The second boost converter 32 is coupled to the latch controller 21 and includes a second inductor 84 coupled between a first backup positive terminal 86 of the first backup energy source 24 and a second boost node 88. A second boost switch 90 is coupled between the second boost node 88 and the electrical ground 80 and the second boost node 88 is coupled to the latch electric motor 9. As shown, the latch controller 21 can sample the low side current of the second boost switch 90 using the second current probe 91.

A second backup switch 92 is coupled between the second backup energy source 26 and the first inductor 72 and controlled by the latch controller 21 for coupling and decoupling the second backup energy source 26 from the first backup energy source 24. A first backup switch 94 is coupled between the first backup energy source 24 and the second inductor 84 and controlled by the latch controller 21 for coupling and decoupling the first backup energy source 24 from the second inductor 84.

A bus capacitor 98 is connected in parallel with the latch electric motor 9 and a parallel capacitor 100 is in parallel with the main power source 4. A clamp 102 is also in parallel with the main power source 4. The latch assembly 1 also includes a Schottky diode 104 having an anode connected to a main positive terminal of the main power source 4 and a cathode connected to the latch electric motor 9.

A buck switch 106 is coupled to a main positive terminal 108 of the main power source 4 and to the second inductor 84 and controlled by the latch controller 21, and, for example, controlled by boost controller 23 (e.g., as part of latch controller 21), to reduce a battery voltage from the main power source 4 to charge the first backup energy source 24 (when the main power source 4 is available).

A supply diode 109 and a supply resistor 110 are connected between the first backup positive terminal 86 of the first backup energy source 24 and a supply node 112. A second supply diode 111 and a second supply resistor 113 are connected between the buck switch 106 and the supply node 112. A low dropout regulator 114 is coupled to the supply node 112 and to the latch controller 21 and a supply capacitor 116 is coupled between the supply node 112 and an electrical ground 80. Boost controller 23 is supplied power from the supply node 112 from Vdriver when the main vehicle battery is available, or from the first back up energy source 24 when Vdriver is not available. Latch controller 21 including boost controller 23 may also be supplied power in a failure condition in a similar manner.

The first exemplary embodiment of the latch assembly 1 also includes a bridge driver 118 that includes a bridge input 120 coupled to the latch controller 21, or boost controller 23, and a supply input 122 coupled to the supply node 112 and a first bridge output 124 coupled to the buck switch 106 and a second bridge output 126 coupled to the second boost switch 90. Latch assembly 1 also includes a bridge driver 119 that includes a bridge input 121 coupled to the latch controller 21, boost controller 23 and a supply input 123 coupled to the supply node 112 and a first bridge output 125 coupled to the buck switch 73 and a second bridge output 127 coupled to the first boost switch 78. The latch controller 21 may include a motor controller 128 to control latching or unlatching or locking or unlocking of the latch assembly 1, for example by controlling the latch electric motor 9, include the boost controller 23. Specifically, the boost controller 23 controls the boosting operations and charging operations, for example by controlling the buck switch 106, the first boost switch 78, second boost switch 90, and the first backup switch 94. Thus, the latch controller 21 may include the boost controller 23 and the motor controller 128 in an integrated configuration, such as an integrated microchip. Alternatively, as mentioned above, the latch controller 21 may be provided as a distributed controller, for example, by providing the motor controller 128 separate from the boost controller 23 with each provided in distinct microchips mounted to the printed circuit board 65, for example. Motor controller 128 may also be provided remotely separated from the boost controller 23, for example each provided on separate printed circuit boards forming part of separate components.

So, the backup energy source subassembly 20 including the latch controller 21 is operable in a plurality of modes including the normal operating mode (e.g., when the main power source 4 is available) and the failure operating mode (e.g., when the main power source 4 is not available). The latch controller 21 is configured to detect one of a latch request and a completed latch operation. The latch controller 21 also is configured to detect whether there is one of the normal operating condition and the failure operating condition.

Figure 6:
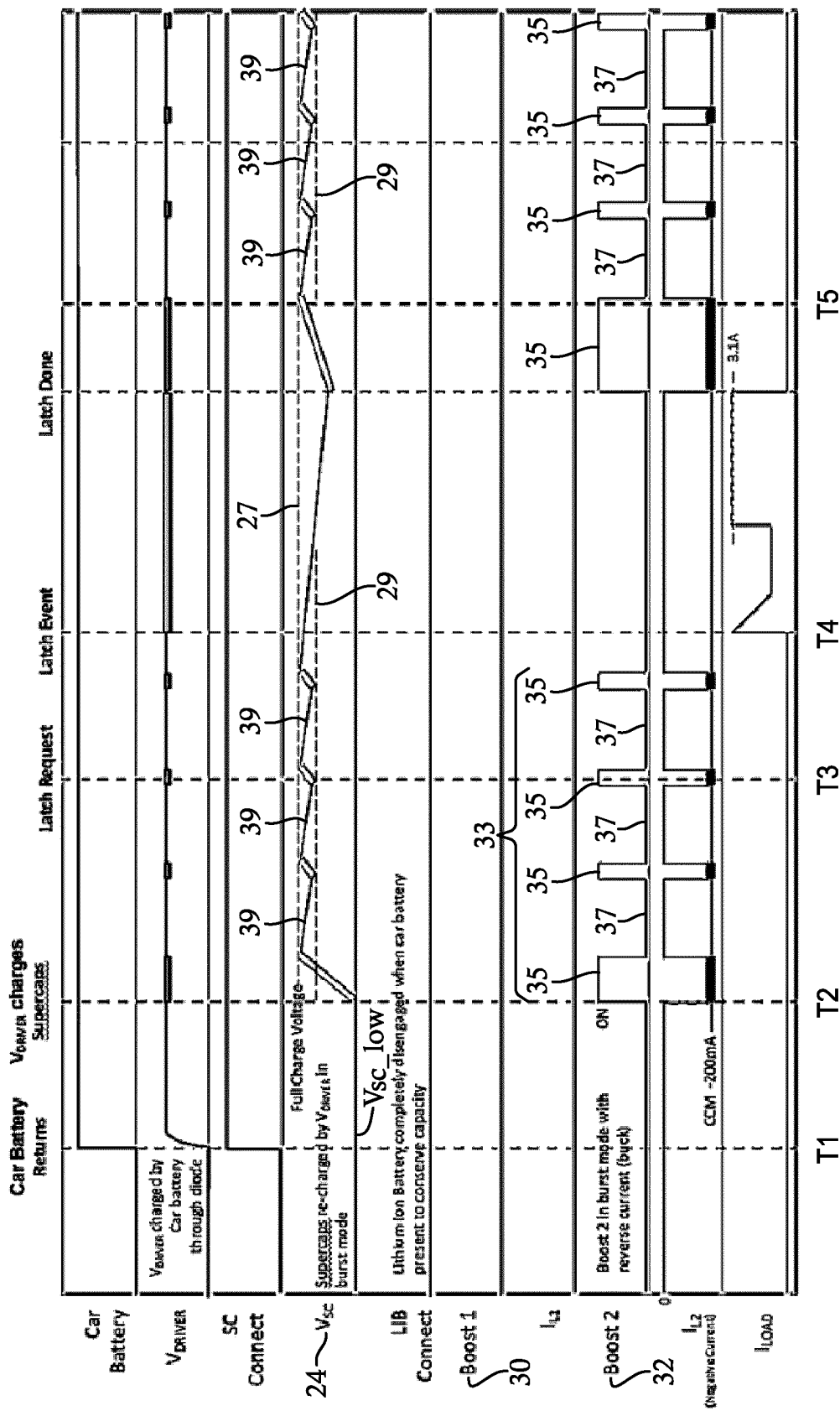
FIG. 6 illustrates a sequence of operation for the first exemplary embodiment of the latch assembly while a main power source is available according to aspects of the disclosure.

A sequence of operation during the normal operating condition is best shown in FIG. 6. At a time T1, the main power source 4 is available and the voltage available to the at least one actuation group 6' (Vdriver) is provided directly from the main power source 4 through the main power diode 104, 144 (Schottky diode 104 in the first exemplary embodiment). The voltage of the main power source 4 is shown as Car Battery. The first backup switch 94 (indicated as SC connect) causes the first backup energy source 24 to stay connected. At a time T2, the voltage of the first backup energy source 24 (Vsc) is recharged by Vdriver in a burst mode to an upper voltage threshold level voltage, for example first backup energy source 24 (Vsc) may be intermediately recharged by Vdriver in a burst mode to the upper charge voltage level (e.g., a full charge or full voltage threshold level 27), after having been allowed to be discharged to a lower voltage threshold level Vsc_low. The second boost converter 32 (Boost 2) is operated in a buck mode as illustrated at reference number 33 to cyclically charge, using the main power source 4, the first backup energy source 24 to the upper voltage threshold level or full voltage threshold level 27 from a lower voltage threshold level (e.g., partial voltage threshold voltage level 29). So, upper voltage threshold voltage level is illustratively the full charge or full voltage threshold level 27 of the first backup energy source 24, however, other voltage levels may be utilized instead. In other words, second boost converter 32 (Boost 2) is operated in a buck mode providing pulses of negative current shown as pulses 35 when Vsc is detected to be at or below the partial voltage threshold voltage level 29 to bring the voltage level of Vsc to the upper voltage threshold level (e.g., full voltage threshold level 27). Second boost converter 32 (Boost 2) is then not operated at 37 for a period of time thereby allowing Vsc to drop as illustrated by slope 39 to the partial voltage threshold level 29. The second backup energy source 26 remains disconnected (the second backup switch 92, indicated as LIB connect, remains open) while the main power source 4 is available. In other words, the latch controller 21 is configured to disconnect the second backup energy source 26 from the first backup energy source 24 during normal operating condition to conserve energy stored in the second backup energy source 26, and for example prevent leakage current from the second backup energy source 26. Also, the first boost converter 30 (coupled to the second backup energy source 26), designated in FIG. 6 as Boost 1, is not operated during the normal operating condition, consequently, there is no current IL1 through the first inductor 72. In an embodiment, the first boost converter 30 (coupled to the second backup energy source 26), designated in FIG. 6 as Boost 1, may be operated in a buck mode during the normal operating condition when first backup energy source 24 is a rechargeable backup energy source to recharge first backup energy source 24. However, as shown, the second boost converter 32, Boost 2, is operated in burst mode with reverse current (buck) to charge the first backup energy source 24 and the current through the second inductor 84 IL2 is shown as a negative current. Following a latch request during normal operating condition (shown at time T3), the voltage provided to the at least one actuation group 6', Vdriver is provided from the main power source 4. The second boost converter 32, Boost 2 runs with a voltage mode whereby an internal proportional integral (PI) loop (e.g., of latch controller 21) compares the measure Vdriver versus a reference and changes the duty cycle of the second boost converter 32 PWM signal in order regulate Vdriver to 10V for example during the latch event at time T4 and the latch event concludes at time T5.

Figure 7:
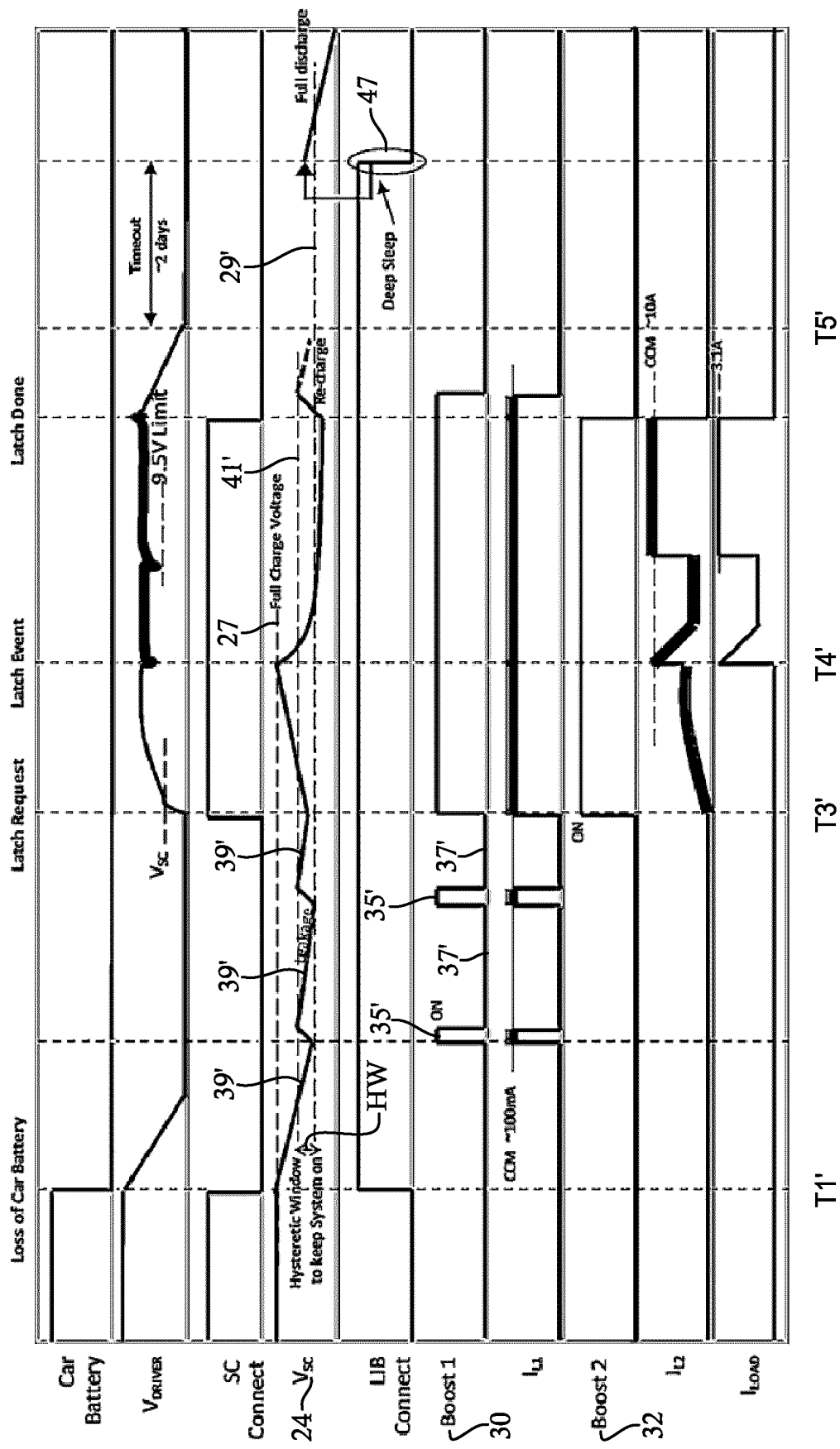
FIG. 7 illustrates a sequence of operation for the first exemplary embodiment of the latch assembly while the main power source is not available according to aspects of the disclosure.

As shown in FIG. 7, at time T1', there is a loss of the main power source 4 (voltage of the main power source is again shown as Car Battery). So, during the failure operating mode, the main power source 4 is no longer maintaining Vdriver and thus, the latch controller 21 temporarily disconnects the first backup energy source 24 (SC connect is shown low) upon detection of the failure operating mode, and also prior to a subsequent latch request during a later normal operating condition. The voltage of the first backup energy source 24 (Vsc) is allowed to discharge partially to a standby or intermediate voltage level 41' lower than the full charge or full voltage threshold level 27, and is maintained at the standby or intermediate voltage level 41' lower than the full voltage threshold level 27 in order to keep the system on (for example to provide energy from (Vsc) to VCCdry or supply node 112 for supplying power to the boost controller 23) and compensate for any leakage of the first backup energy source 24 in a "hysteretic window" (shown as HVV). In other words, the voltage of the first backup energy source 24 (Vsc) may be intermediately recharged by the second backup energy source 26 in a burst mode to the intermediate voltage level 41' after having been allowed to be discharged to a lower voltage threshold level (e.g., full discharge level). For example, the first boost converter 30 (Boost 1) is operated in a boost mode as illustrated in FIG. 7 to cyclically charge, using second backup energy source 26, the first backup energy source 24 to a partial voltage threshold level (e.g., the intermediate voltage level 41') from a lower voltage threshold level (e.g., full discharge level 29'). In other words, first boost converter 30 is operated when Vsc is detected to be at or below a partial charge or lower voltage threshold level 29' (e.g., full discharge level) to bring the level of Vsc to the intermediate voltage level 41'. Second boost converter 32 (Boost 2) is then not operated allowing Vsc to drop to the lower voltage threshold level 29' (e.g., full discharge level). The first boost converter 30 charges the first backup energy source 24 to the full charge or full voltage level 27 and the second boost converter 32 regulates Vdriver starting at time T3' at the latch request and during the latch event at time T4' until the end of the latch event at time T5'.

Figure 7A:
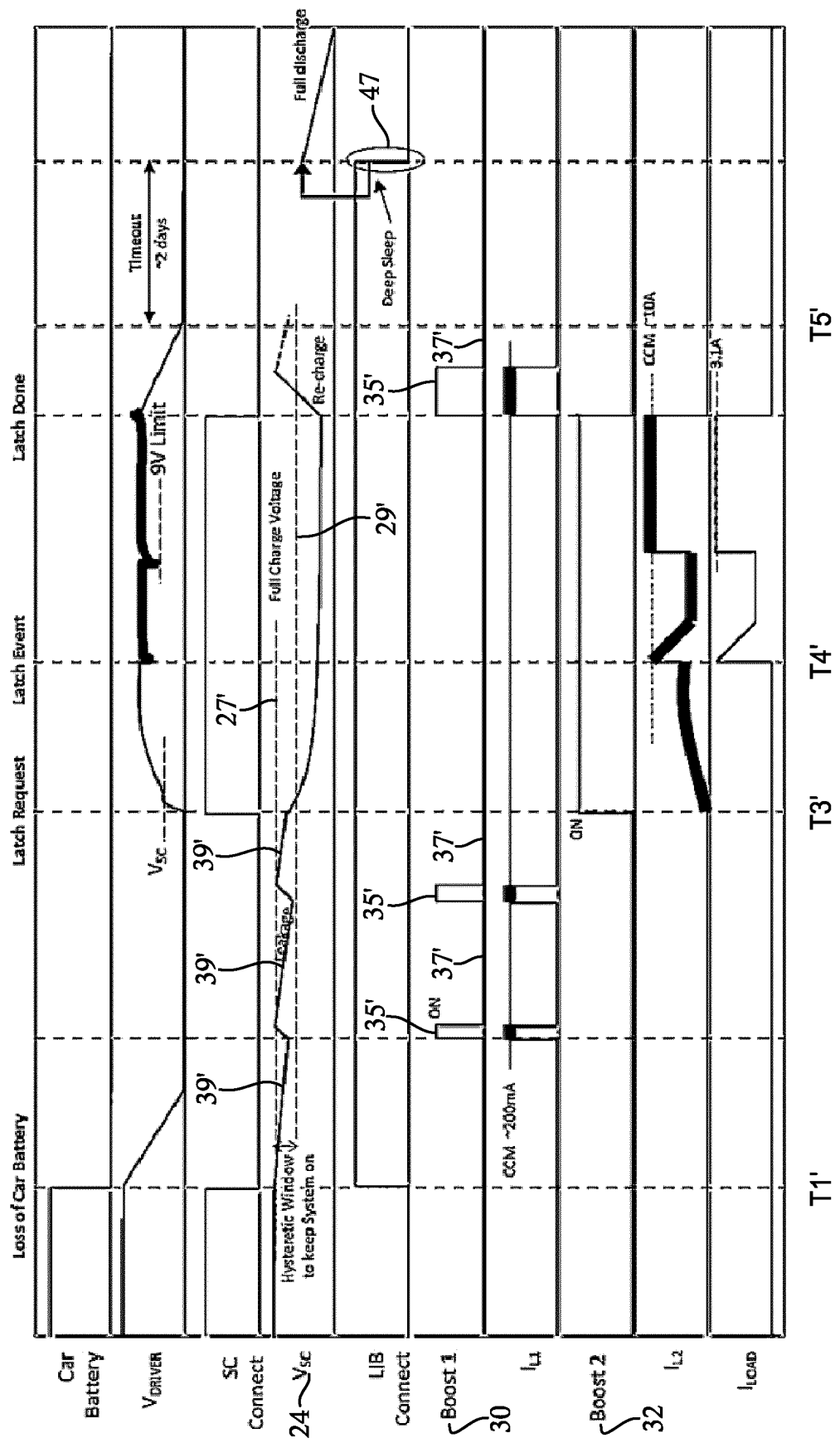
FIG. 7A illustrates a sequence of operation for the first exemplary embodiment of the latch assembly while the main power source is not available according to other aspects of the disclosure.

Alternatively, and as illustrated in FIG. 7A, the first boost converter 30 (Boost 1) is operated in a boost mode to cyclically charge, using the second backup energy source 26, the first backup energy source 24 to an upper voltage threshold level (e.g., a full charge or full voltage level 27' from a partial charge or partial voltage threshold level 29' during the failure operating condition. First boost converter 30 is operated in a boost mode to cyclically controlled supply current pulses 35' followed by periods 37' where no current pulses are supplied. The energy to maintain the first backup energy source 24 at this level is provided by the second backup energy source 26, so at the moment in time when the main power source is lost, the second backup switch 92, indicated as LIB connect, connects the second backup energy source 26 to the first backup energy source 24, and the first boost converter 30 (Boost 1) is operated to maintain the voltage of the first backup energy source 24 at the intermediate voltage (e.g., partial voltage threshold level 29'). To control and regulate the constant current needed from the second backup energy source 26, first boost converter 30 is operated in a current-mode control. A quasi-fixed frequency (QFF) current-mode control may be provided which compared to a voltage mode control, current-mode control may provide an accurate control of the inductor current and a faster dynamic response. Therefore, there is current through the first inductor 72 (IL1). In other words, the latch controller 21, for example the boost controller 23, is further configured to connect the second backup energy source 26 to the first backup energy source 24 (through the second backup switch 92) and to boost the voltage from the second backup energy source 26 (LIB) to charge the first backup energy source 24 to an intermediate voltage level (e.g., partial voltage threshold level 29') using the first boost converter 30 during the failure operating condition in response to detecting the voltage level of the first backup energy source 24 falling below the "hysteretic window" (HW). During the time prior to latch request (between T1' and T3') and during the failure operating mode, the second boost converter 32 (Boost 2) is not operated, and thus, there is no current through the second inductor 84 (IL2).

Once there is a latch request at time T3' during the failure operating mode, the latch controller 21 temporarily connects the first backup energy source 24 (SC connect is shown high) and the voltage of the first backup energy source 24 (Vsc) climbs momentarily to the full charge voltage 27' because the latch controller 21 controls the first boost converter 30 (Boost 1) to charge the first backup energy source 24 (again using energy from the second backup energy source 26). So, the latch controller 21 is further configured to connect the first backup energy source 24 to the at least one actuation group 6' in response to detecting the latch request at time T3' and to boost a voltage from the first backup energy source 24 to an active voltage level (e.g., approximately 9 volts) in response to the latch request (using the second boost converter 32). Thus, the latch controller 21 can boost a voltage from the second backup energy source 26 to charge the first backup energy source 24 using the first boost converter 30 during the failure operating condition and couple the first backup energy source 24 to the motor 9 (of the at least one actuation group 6') to boost using the second boost converter 32 a voltage of the second backup energy source 26 to drive the motor 9 in response to detecting the failure operating condition. Consequently, Vdriver rises following the latch request at time T3' due to the connection of the first backup energy source 24 and the charging of the first backup energy source 24 by the first boost converter 30 using energy from the second backup energy source 26 through the latch event at time T4'.

Then, when the latch operation or event is completed (e.g., the completed latch operation is detected by the latch controller 21) at time T5', the first backup energy source 24 is again disconnected (SC Connect goes low). Specifically, the latch controller 21 disconnects the first backup energy source 24 from the at least one actuation group 6' in response to detecting the completed latch operation using the first backup switch 94. Energy from the second backup energy source 26 is used to recharge the first backup energy source 24. As shown, LIB Connect (second backup switch 92) indicates that the second backup energy source 26 remains connected to the first backup energy source 24 and the second boost converter 32 (Boost 1) operates to recharge or bring the voltage of the first backup energy source 24 back to the intermediate voltage level (e.g., full charge voltage 27'). Thus, the latch controller 21 charges the first backup energy source 24 using energy from the second backup energy source 26 based on the detection of the one of the latch request and the completed latch operation and the failure operating condition.

The latch controller 21 is additionally configured to disconnect (e.g., using the second backup switch 92) the second backup energy source 26 from the first backup energy source 24 after a predetermined period of time (shown in FIGS. 7 and 7A as a timeout of 2 days) following the failure operating condition being detected and following detection of the completed latch operation at time T5'.

As shown in FIG. 7A, the difference between FIG. 7 being that the during a latch request and/ or latch event, first boost converter 30 is not operated, but rather first boost converter 30 is operated after the latch event is completed to recharge the first backup supply 30 in a burst mode as described hereinabove.

Figure 8:
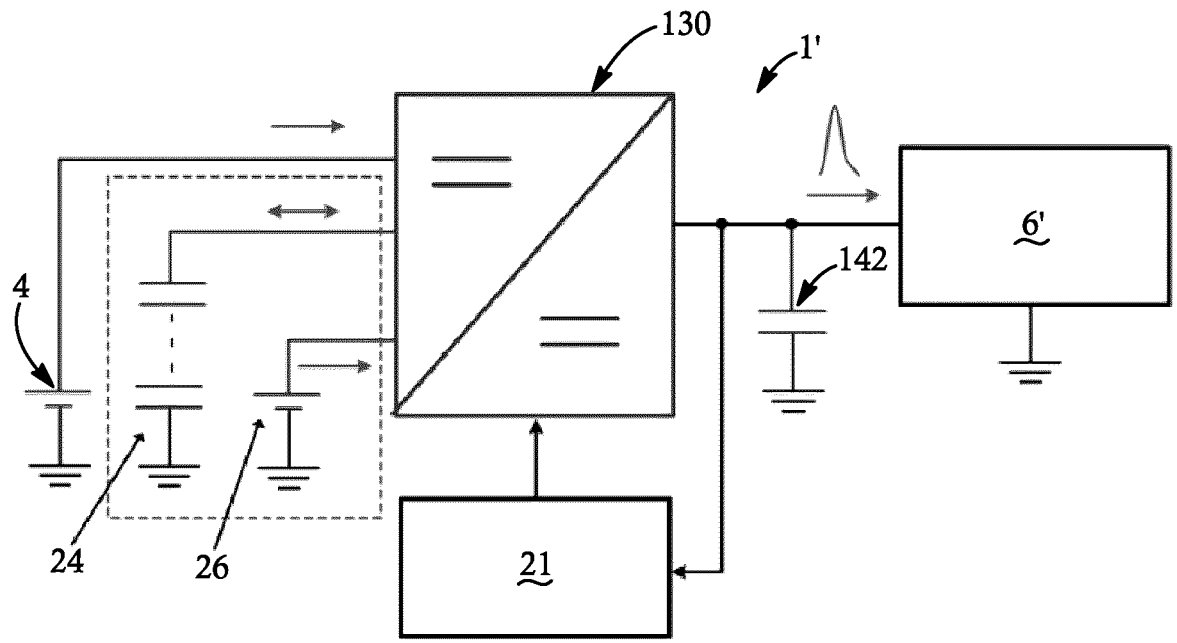
FIGS. 8 and 9 are block diagram of a second exemplary embodiment of a latch assembly for the closure panel of the motor vehicle of FIG. 1 according to aspects of the disclosure.
Figure 9:
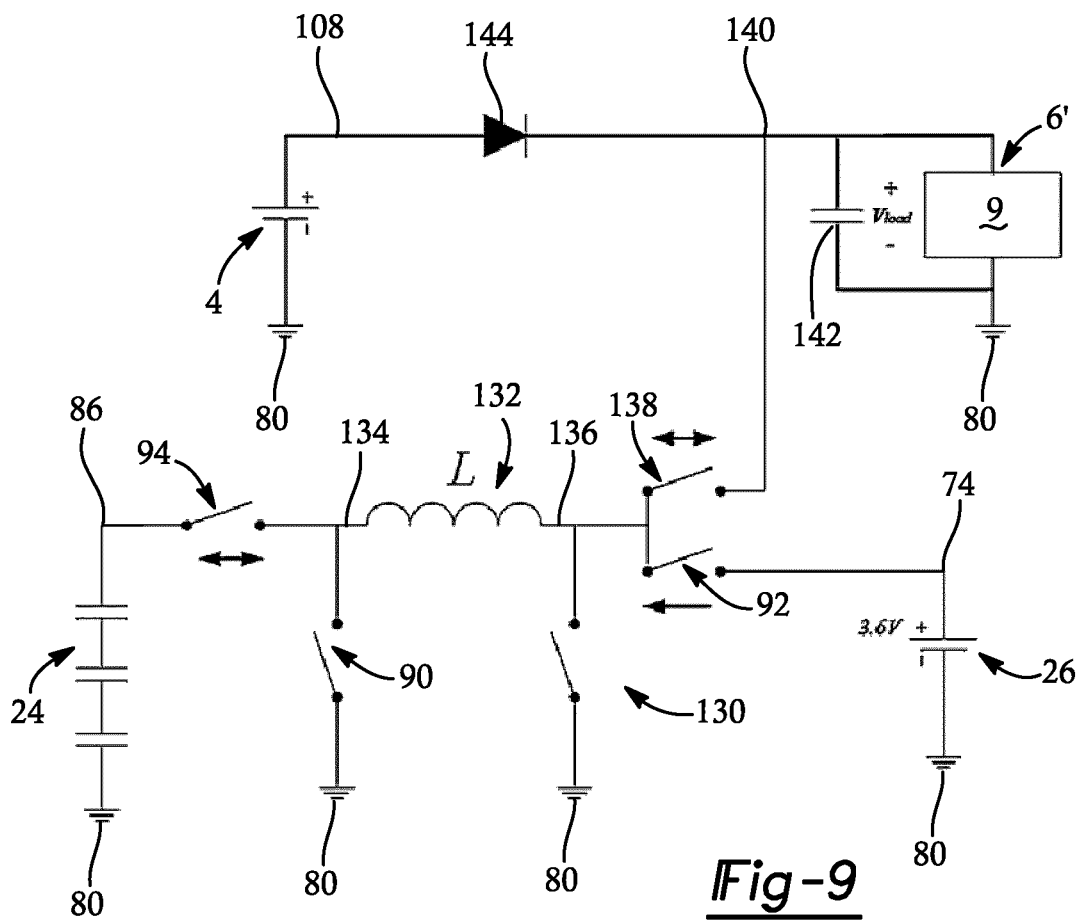
Figure 10:
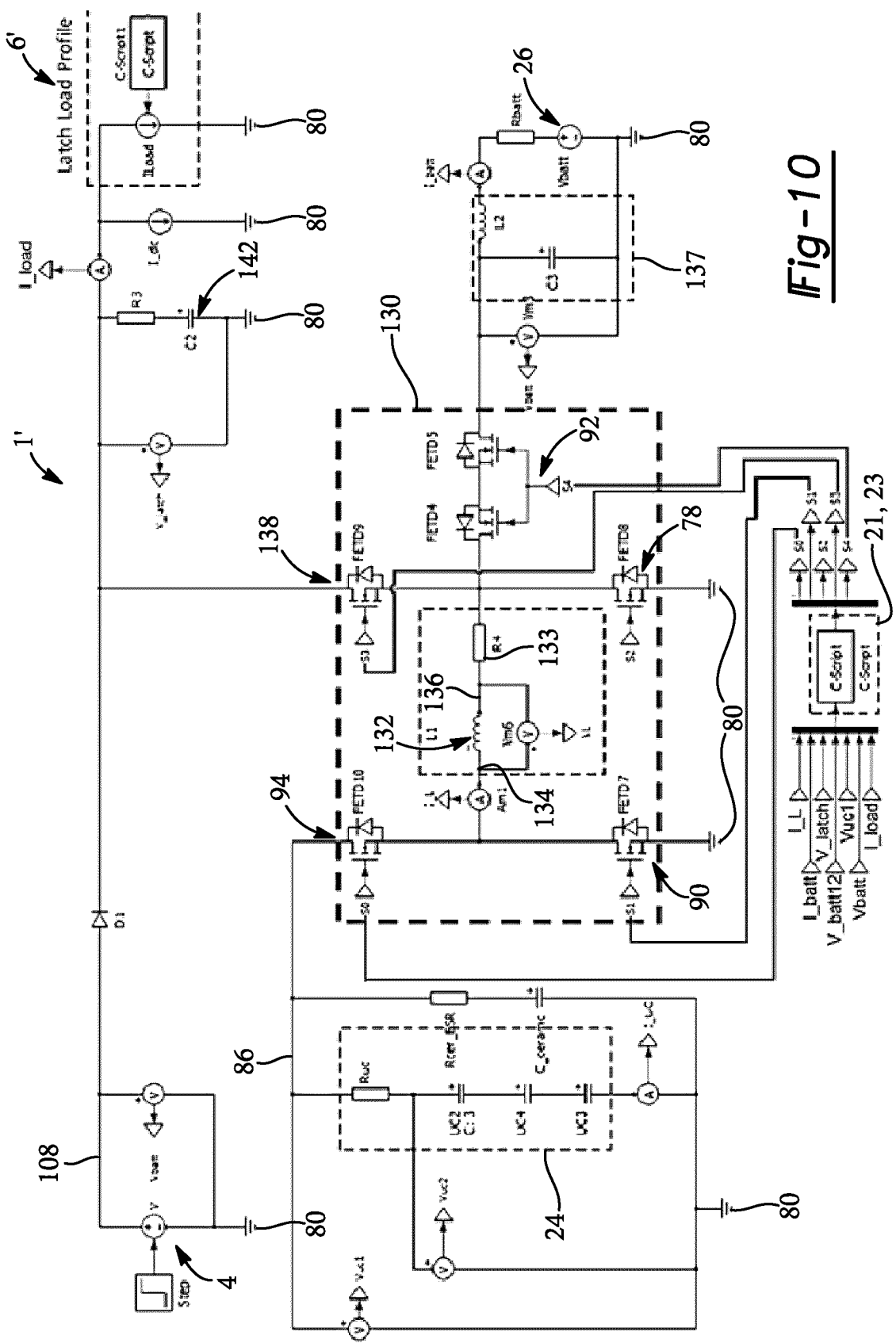
FIG. 10 is a circuit schematic of the second exemplary embodiment of the latch assembly according to aspects of the disclosure.

As best shown in FIGS. 8-10, a second exemplary embodiment of a latch assembly 1' for the closure panel 2 of the motor vehicle 3 is provided. The second exemplary embodiment of a latch assembly 1' differs from the first exemplary embodiment of the latch assembly 1, as the first boost converter 30 and the second boost converter 32 comprise a multi-port converter 130. The single-inductor topology of the multi-port converter 130 allows for two modes. First, when the main power source 4 is available or present, the multi-port converter 130 provides energy to the load (e.g., the electric motor 9) and first backup energy source 24. Second, when the main power source 4 is not available or disconnected, the second backup energy source 26 charges the first backup energy source 24, which in turn, provide energy to the latch assembly 1' (e.g., the electric motor 9).

More specifically, the multi-port converter 130 includes a single inductor (boost inductor 132) having a first boost inductor terminal 134 coupled to the first backup positive node 86 of the first backup energy source 24 and a second boost inductor terminal 136 coupled to the second backup positive node 74 of the second backup energy source 26 (shown in FIG. 10 including an equivalent series resistance (ESR) 133). The multi-port converter 130 also includes a first boost switch 78 coupled between the second boost inductor terminal 136 of the boost inductor 132 and an electrical ground 80 and controlled by the latch controller 21. A second boost switch 90 is coupled between the first boost inductor terminal 134 of the boost inductor 132 and the electrical ground 80 and controlled by the latch controller 21.

Figure 11:
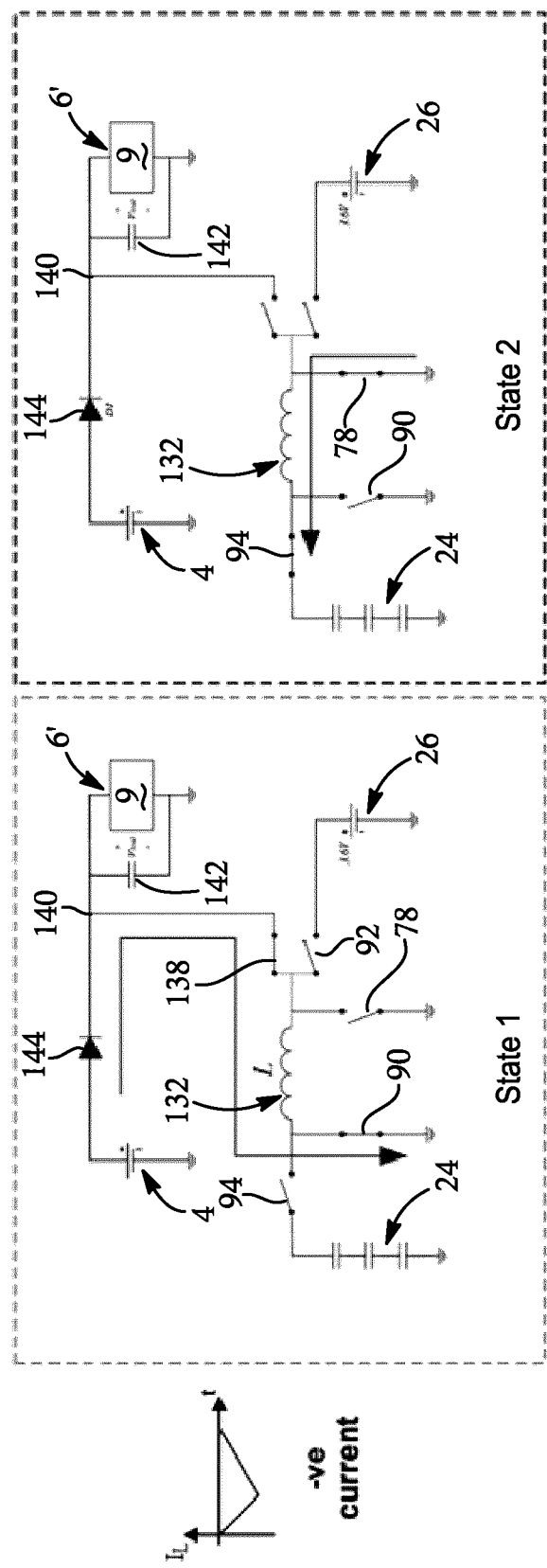
FIG. 11 illustrates a first state and a second state of a multi-port converter of the second exemplary embodiment of the latch assembly according to aspects of the disclosure.
Figure 12:
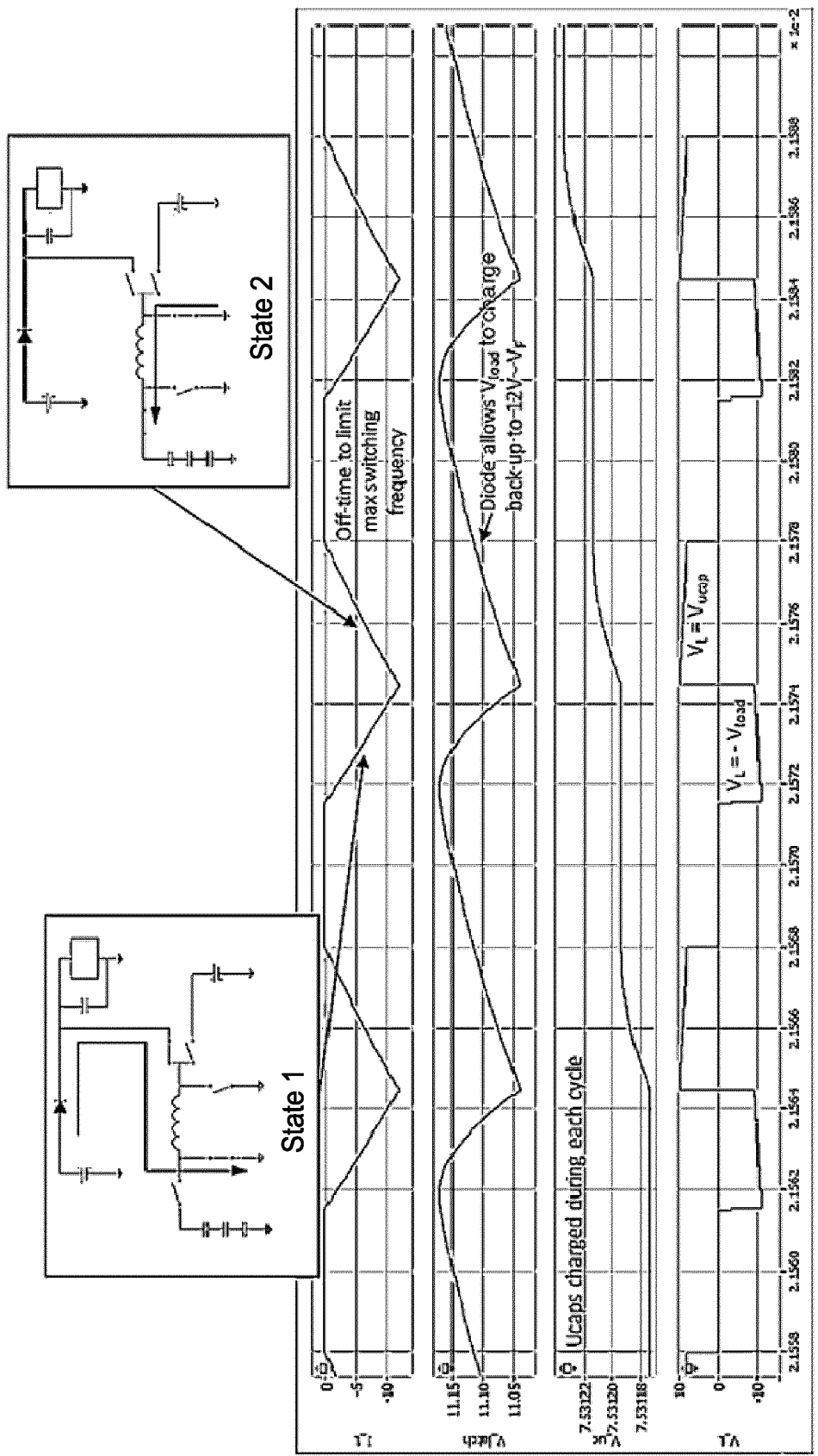
FIG. 12 illustrates a sequence of operation for the second exemplary embodiment of the latch assembly with the multi-port converter in first state and the second state while the main power source is available according to aspects of the disclosure.
Figure 23:
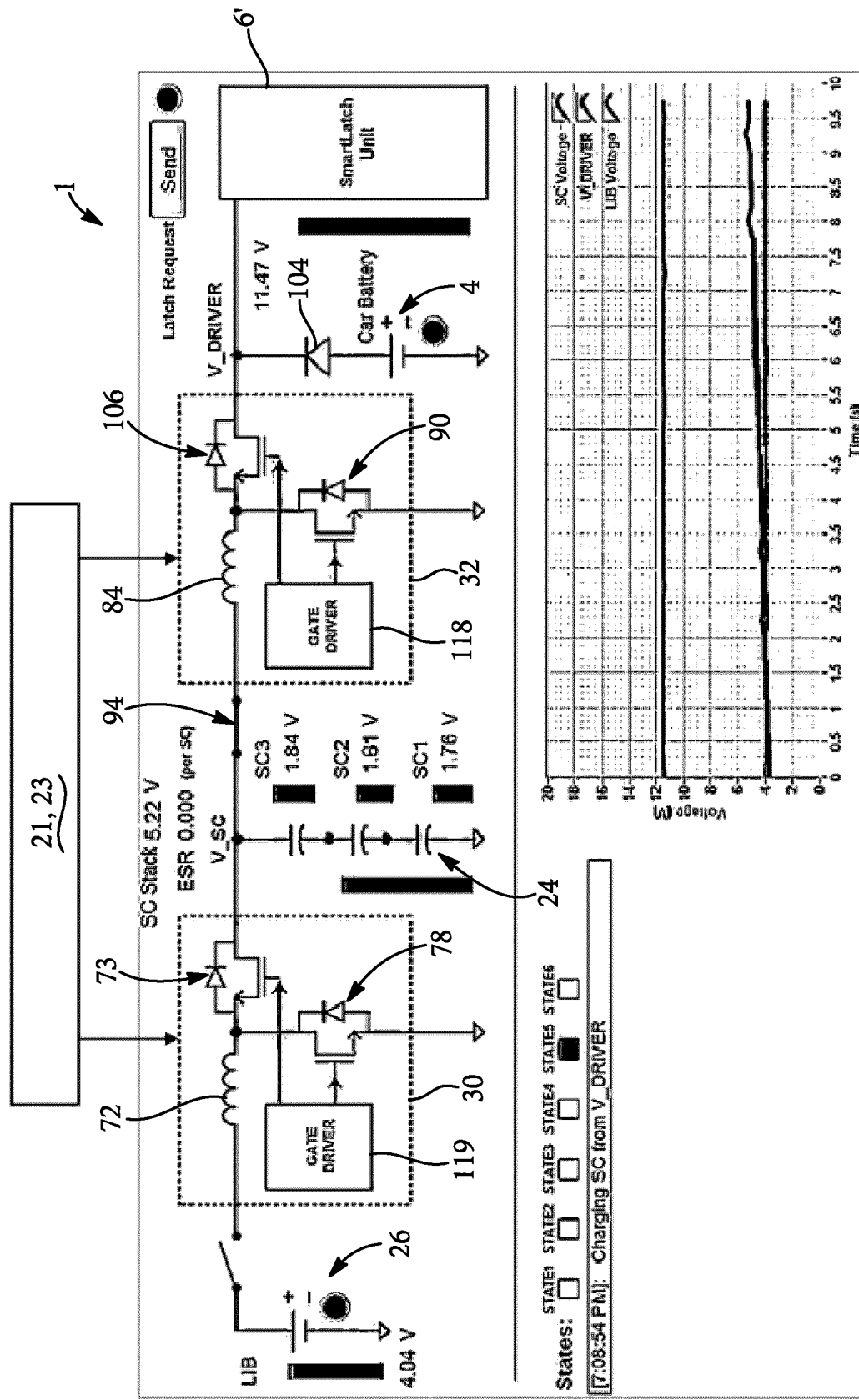
FIG. 23 illustrates a sequence of operation for the first exemplary embodiment of the latch assembly with a dual boost converter configuration in first state and the second state while the main power source is available according to aspects of the disclosure.

The multi-port converter 130 further includes a first backup switch 94 coupled between the first backup positive node 86 and the first boost inductor terminal 134 and controlled by the latch controller 21 for coupling and decoupling the first backup energy source 24. In addition, the multi-port converter 130 includes a second backup switch 92 coupled between the second backup positive node 74 and the second boost inductor terminal 136 and controlled by the latch controller 21 for coupling and decoupling the second backup energy source 26. A battery filter 137 (FIG. 10) may be disposed between the second backup energy source 26 and the second backup switch 92.The multi-port converter 130 further includes a motor and battery connect switch 138 coupled between the second boost inductor terminal 136 and a shared node 140 coupled to a positive battery terminal 108 of the main power source 4 and to the latch electric motor 9 and controlled by the latch controller 21 for coupling and decoupling both the main power source 4 and the latch electric motor 9 from the first boost converter 30 and second boost converter 32. The second exemplary embodiment of the latch assembly 1' also includes a load link capacitor 142 connected in parallel with the latch electric motor 9 and a main power diode 144 connected between the main power source 4 and the shared node 140. Other hybrid energy topology configurations employing are possible, such as those described in "Predictive Algorithm for Optimizing Power Flow in Hybrid Ultracapacitor/Battery Storage Systems for Light Electric Vehicles" by Omar Laldin, Mazhar Moshirvaziri, and Oliver Trescases, IEEE Transactions on Power Electronics 28(8), August 2013, pages 3882-3895, the entire contents of which are incorporated by reference herein Thus, as best shown in FIG. 11, the latch controller 21 of the second exemplary embodiment of the latch assembly 1' is configured to close the motor and battery connect switch 138 and the second boost switch 90 and open the first backup connect switch 94 and the first boost switch 78 and the second backup switch 92 to store energy in the boost inductor 132 from the main power source 4 through the main power diode 144 in a first state, State 1 starting at a zero crossing of current in the boost inductor 32 until a hysteretic control reference. So, for example, when the main power source 4 is available and the latch controller 21 is operating in the normal operating condition, the latch controller 21 is also configured to close the first boost switch 78 and the first backup switch 94 and open the second boost switch 90 and the second backup switch 92 and the motor and battery connect switch 138 to charge the first backup energy source 24 using energy stored in the boost inductor 132 in a second state, State 2 starting at a current reference, the boost inductor 132 is discharged until a zero crossing of the current in the boost inductor 132 (again, when the main power source 4 is available and the latch controller 21 is operating in the normal operating condition). If the first backup energy source 24 is not fully charged, the multi-port converter 130 regulates the first backup energy source 24 by storing energy from Vload into the boost inductor 132 and then into the first backup energy source 24 (i.e., buck converter). The inductor current (IL) of the boost inductor 132 (V_L), voltage at the at least one actuation group 6' (Vload or Vlatch), voltage of the first backup energy source 24 (Vuc), and voltage of the boost inductor 132 during the first and second states are shown in FIG. 12. As shown, the main power diode 144 allows Vload to charge back up (e.g., to 12 volts—Vf (voltage across the main power diode 144)) using energy from the main power source 4 and the first backup energy source 24 is charged during each cycle (repeatedly transitioning from the first state to the second state). So, Vload is regulated through the main power diode 144, and the multi-port converter 130 charge the first backup energy source 24 from Vload. FIG. 23 illustrates a corresponding state of the first exemplary embodiment of the latch assembly 1, in accordance with an illustrative embodiment, for example when the main power source 4 is available and the latch controller 21 is operating in the normal operating condition, the latch controller 21 is configured to close the first backup switch 94 to charge the first backup energy source 24 using the second boost converter 32 operating in a buck mode and open second backup switch 92 to conserve the energy of the second backup energy source 26. Optionally, first boost converter 30 may be operated in a buck mode to charge the second backup energy source 26 when embodied as a rechargeable type backup energy source requiring second backup switch 92 to be closed. So, at the point shown, V_DRIVER has a voltage of 11.47V, the first backup energy source 24 has a voltage (V_SC or SC Voltage) of 5.22 volts for the stack of supercapacitors SC1, SC2, SC3 (with respective voltages of 1.76V, 1.61V, and 1.84V) and ESR of 0.000 (per each of the supercapacitors SC1, SC2, SC3) being charged by V_DRIVER or Vload and the second backup energy source 26 is disconnected and has a voltage (LIB voltage) of 4.04 volts. The voltages V_SC, V_DRIVER, and LIB Voltage are shown over time.

Figure 13:
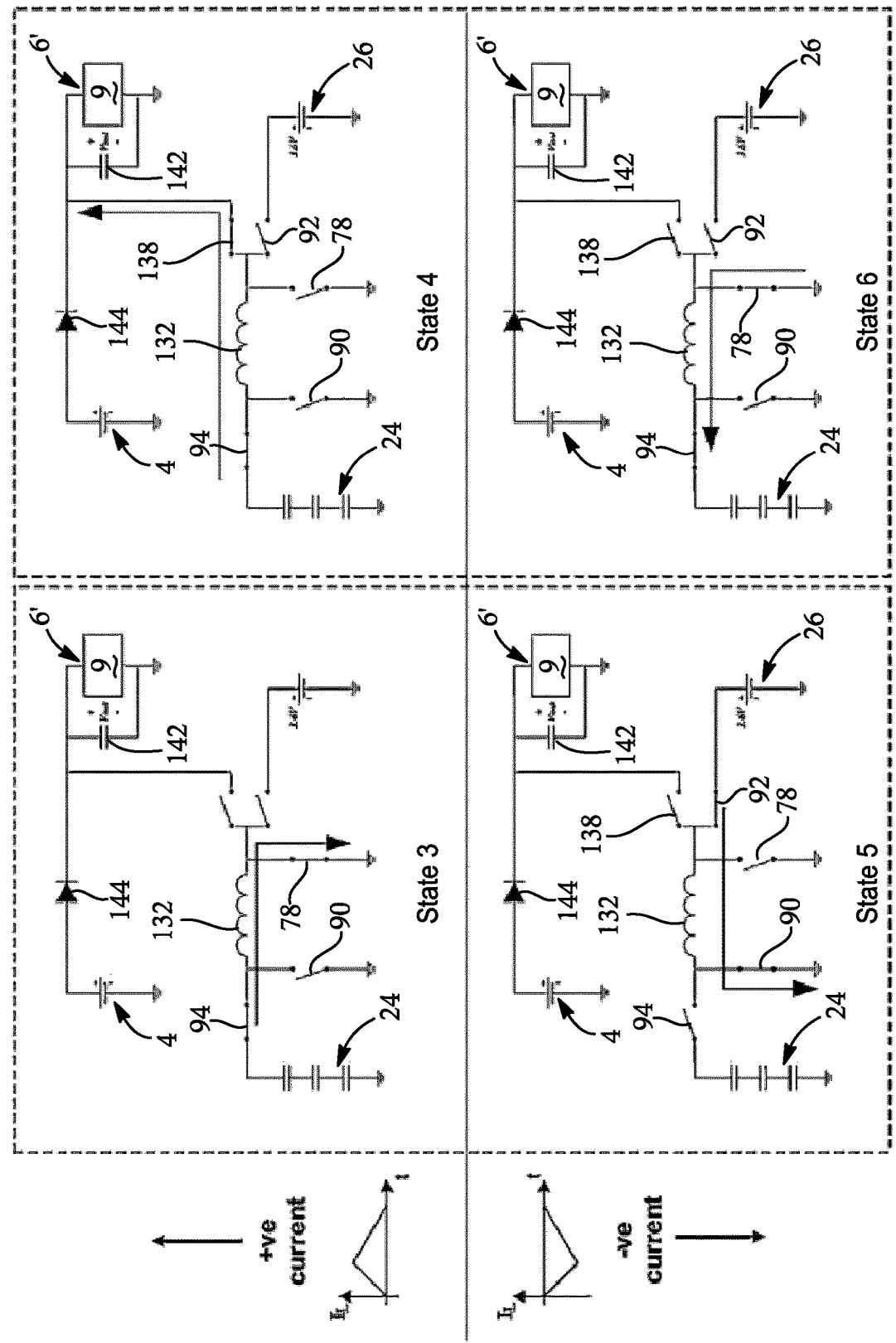
FIG. 13 illustrates a third state and a fourth state and a fifth state and a sixth state of the multi-port converter of the second exemplary embodiment of the latch assembly according to aspects of the disclosure.
Figure 14:
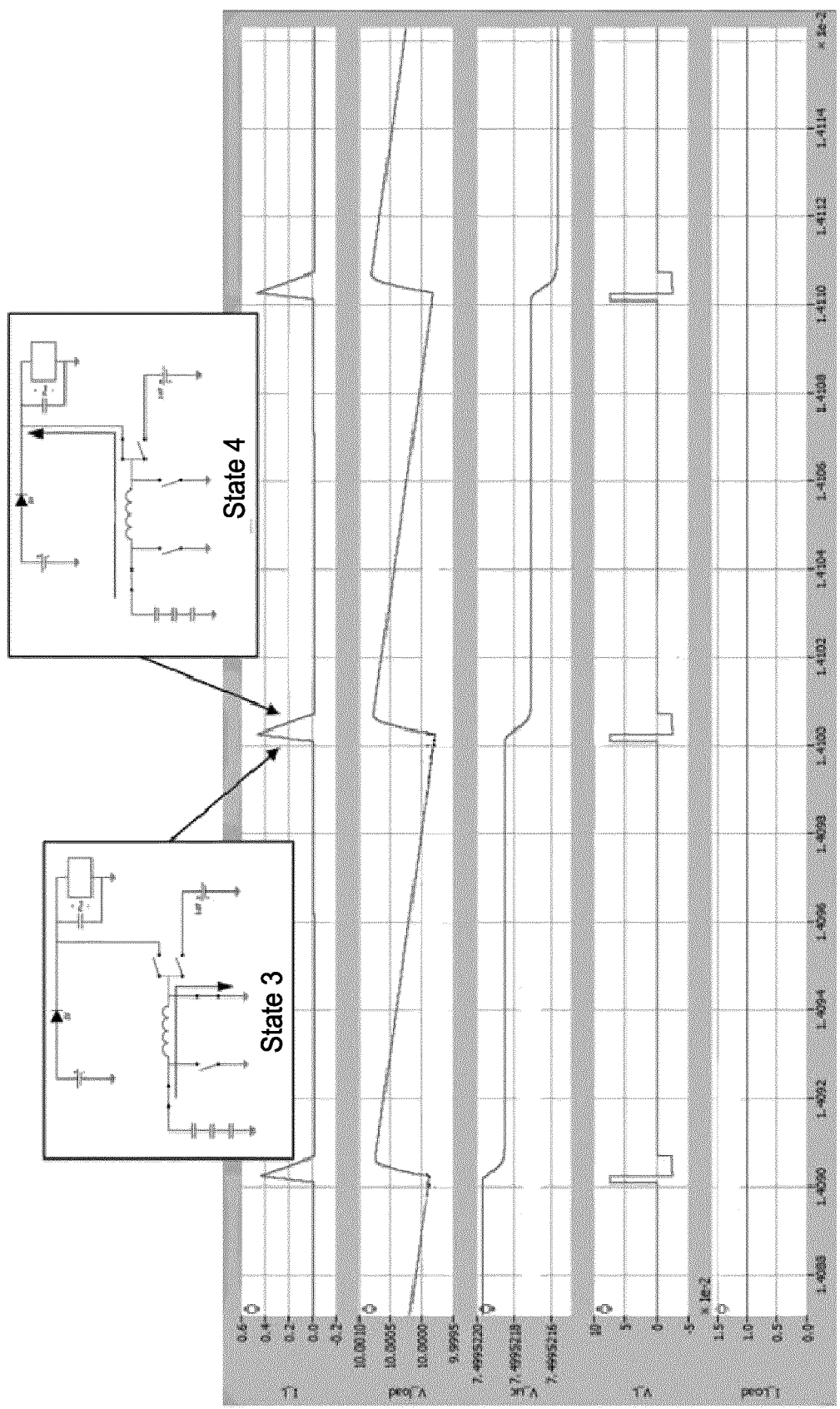
FIG. 14 illustrates a sequence of operation for the second exemplary embodiment of the latch assembly with the multi-port converter in the third state and the fourth state while the main power source is not available according to aspects of the disclosure.

In addition, as best shown in FIG. 13, the latch controller 21 is configured to close the first backup switch 94 and the first boost switch 78 and open the second backup switch 92 and the motor and battery connect switch 138 and the second boost switch 90 to store energy in the boost inductor 132 from the first backup energy source 24 in a third state, State 3 (storing energy in the boost inductor 132 from the first backup energy source 24 starting at a zero crossing of current in the boost inductor 32 until a hysteretic control reference). And, for instance, when the main power source 4 is not available and the latch controller 21 is operating in the failure operating condition, the latch controller 21 closes the first backup switch 94 and the motor and battery connect switch 138 and opens the first boost switch 78 and the second boost switch 90 and the second backup switch 92 to charge the load link capacitor 142 using stored energy from the first backup energy source 24 in a fourth state, State 4 in which the load link capacitor 142 is charged from energy stored in the boost inductor 132 starting at a current reference, the boost inductor 132 is discharged until a zero crossing of the current in the boost inductor 132 (again, when the main power source 4 is not available and the latch controller 21 is operating in the failure operating condition). As shown in FIG. 14, the current of the boost inductor 132 (IL) falls to zero during an off-time to limit a max switching frequency and in a steady state, the voltage of the latch or load (Vload across the load link capacitor 142) is regulated at an active level (approximately 10 volts) with a small ripple from quiescent current. The first backup energy source 24 is consequently discharged during each cycle (repeatedly transitioning from the third state to the fourth state) and a quiescent load current Iload is shown (e.g., approximately 10 milliamperes). So, the first backup energy source 24 is fully charged and the multi-port converter 130 regulates Vload at approximately 10 volts from stored energy in the first backup energy source 24.

Figure 15:
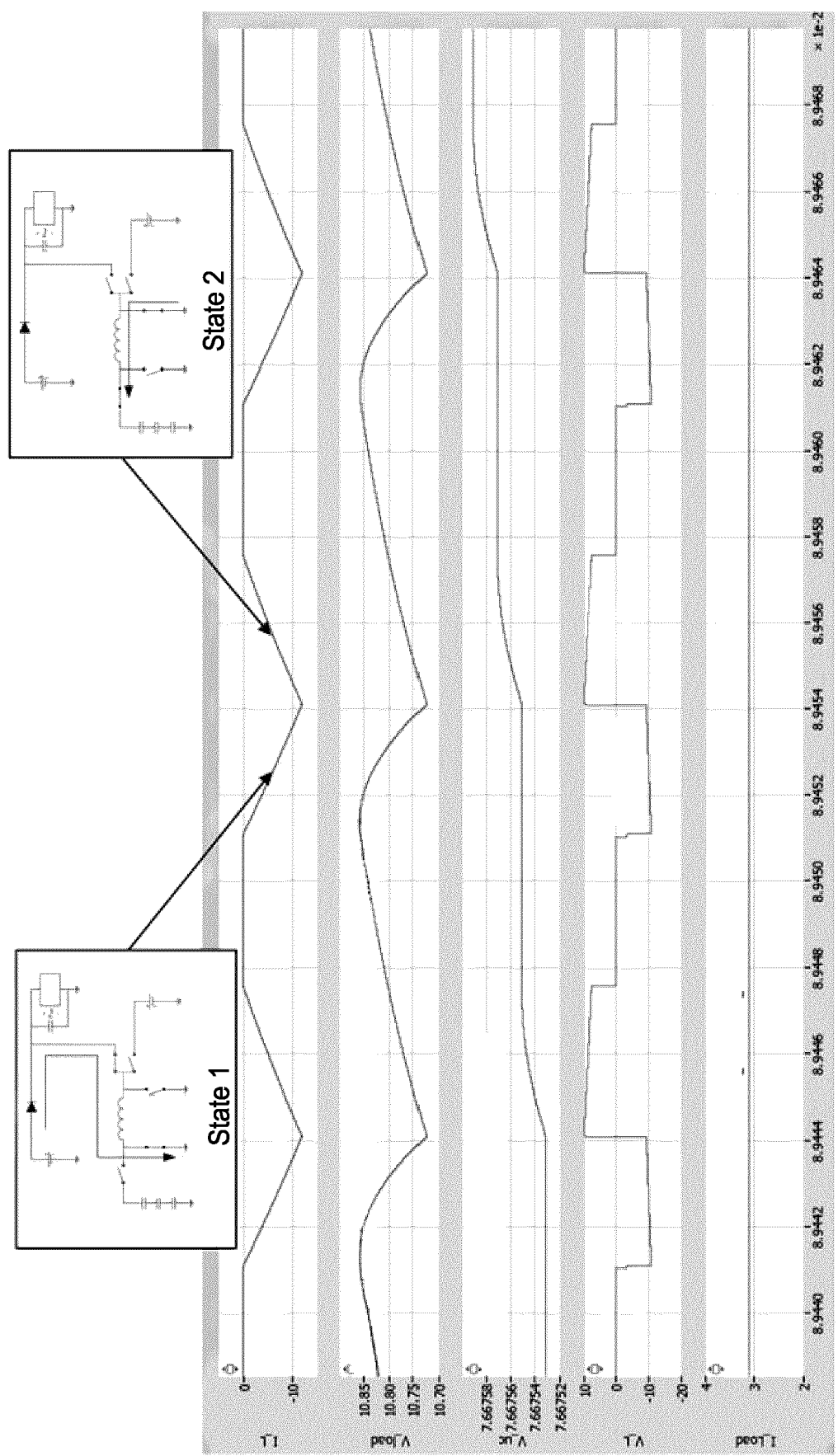
FIG. 15 illustrates a sequence of operation for the second exemplary embodiment of the latch assembly with the multi-port converter in the first state and the second state while the main power source is available during a latch operation according to aspects of the disclosure.

The multi-port converter 130 can also operate in the first and second states when the main power source 4 is available and the latch controller 21 is operating in the normal operating condition, and a latch request is detected, as best shown in FIG. 15. Following the latch request, and when the latch event occurs, Vload is regulated by the main power diode 144 (with some ripple caused by the load or motor 9 and charging the first backup energy source 24) and the first backup energy source 24 is charged through the multi-port converter 130, if necessary (if the voltage of the first backup energy source 24 is lower than a predetermined threshold). The voltage of the first backup energy source 24 (Vuc) shows the first backup energy source 24 being charged every cycle and the instantaneous load current Iload of the load or motor 9 is shown during the latching event.

Figure 16:
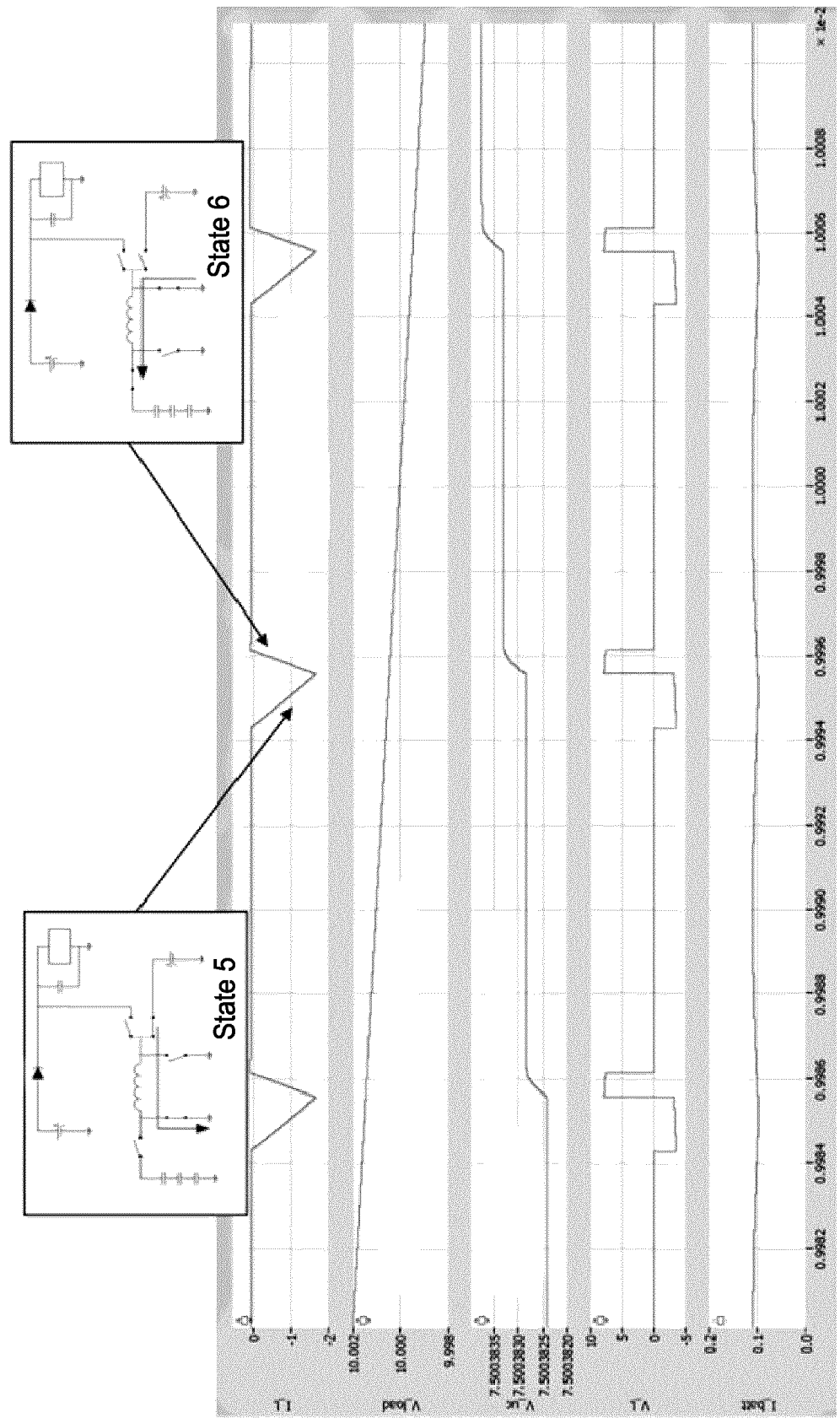
FIG. 16 illustrates a sequence of operation for the second exemplary embodiment of the latch assembly with the multi-port converter in the fifth state and the sixth state while the main power source is not available according to aspects of the disclosure.
Figure 24:
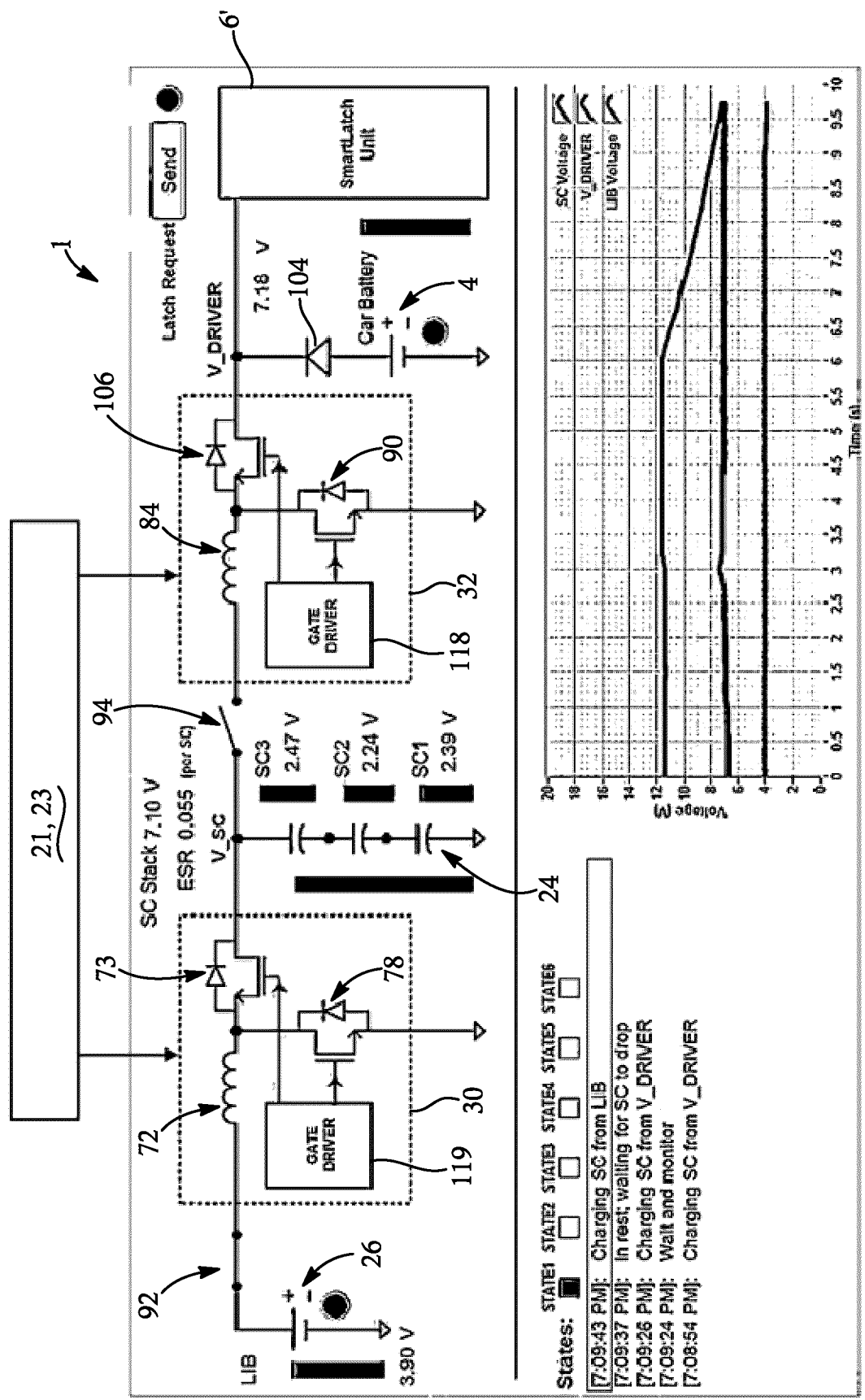
FIG. 24 illustrates a third state and a fourth state and a fifth state and a sixth state of the dual boost converter configuration of the first exemplary embodiment of the latch assembly according to aspects of the disclosure.

Referring back to FIG. 13, the latch controller 21 can then close the second backup switch 92 and the second boost switch 90 and open the first backup switch 94 and the first boost switch 78 and the motor and battery connect switch 138 to store energy in the boost inductor 132 from the second backup energy source 26 in a fifth state, State 5 in which energy from the second backup energy source 26 is stored in the boost inductor 132 (again, storing energy in the boost inductor 132 from the first backup energy source 24 starting at a zero crossing of current in the boost inductor 32 until a hysteretic control reference). And, for example, when the main power source 4 is not available and the latch controller 21 is operating in the failure operating condition, the latch controller 21 additionally is configured to close the first boost switch 78 and the first backup switch 94 and open the second boost switch 90 and the second backup switch 92 and the motor and battery connect switch 138 to charge the first backup energy source 24 using energy stored in the boost inductor 132 in a sixth state, State 6 in which the first backup energy source 24 is charged from the energy stored in the boost inductor 132 (again, starting at a current reference, the boost inductor 132 is discharged until a zero crossing of the current in the boost inductor 132 and when the main power source 4 is not available and the latch controller 21 is operating in the failure operating condition). As shown in FIG. 16, the voltage of the latch or load (Vload across the load link capacitor 142) is constantly discharged from the current going to the latch or motor 9 (to carry out the latch operation or power the motor controller 128 to be able to detect a latch request for example) and the first backup energy source 24 is charged during each cycle (repeatedly transitioning from the fifth state to the sixth state) from the second backup energy source 26 and an average 100 milliampere current from the second backup energy source 26 I_batt is shown. So, Vload is already full and the multi-port converter 130 charges the first backup energy source 24 using energy from the second backup energy source 26. Specifically, as shown, there is an increase in the voltage of the first backup energy source 24 (Vuc) due to the current from the second backup energy source 26 (Ibatt) continuously being supplied as the multi-port converter 130 is operated in the fifth and sixth states. FIG. 24 illustrates a state of the first exemplary embodiment of the latch assembly 1, in accordance with an illustrative embodiment, for example when the main power source 4 is not available and the latch controller 21 is operating in the failure mode, and the latch controller 21 is configured to control the closing of the second backup switch 92 to charge the first backup energy source 24 from the second backup energy source 26 using the second boost converter 32 operating in a boost mode and open the first backup switch 94. So, at the point shown, V_DRIVER has a voltage of 7.18V, the first backup energy source 24 has a voltage V_SC or SC Voltage of 7.10 volts for the stack of supercapacitors SC1, SC2, SC3 (with respective voltages of 2.39V, 2.24V, and 2.47V) and an ESR of 0.055 (per each of the supercapacitors, SC1, SC2, SC3) and is being charged by the second backup energy source 26, which has a voltage LIB Voltage of 3.90 volts. Next, at rest, the controller 21, 23 waits for the voltage V_SC or SC Voltage of the first backup energy source 24 to drop and then charges the first backup energy source 24 from V_DRIVER followed by waiting and monitoring by the controller 21, 23. Then, charging the first backup energy source 24 from V_DRIVER. The voltages V_SC, V_DRIVER, and LIB Voltage are again shown over time.

Figure 17:
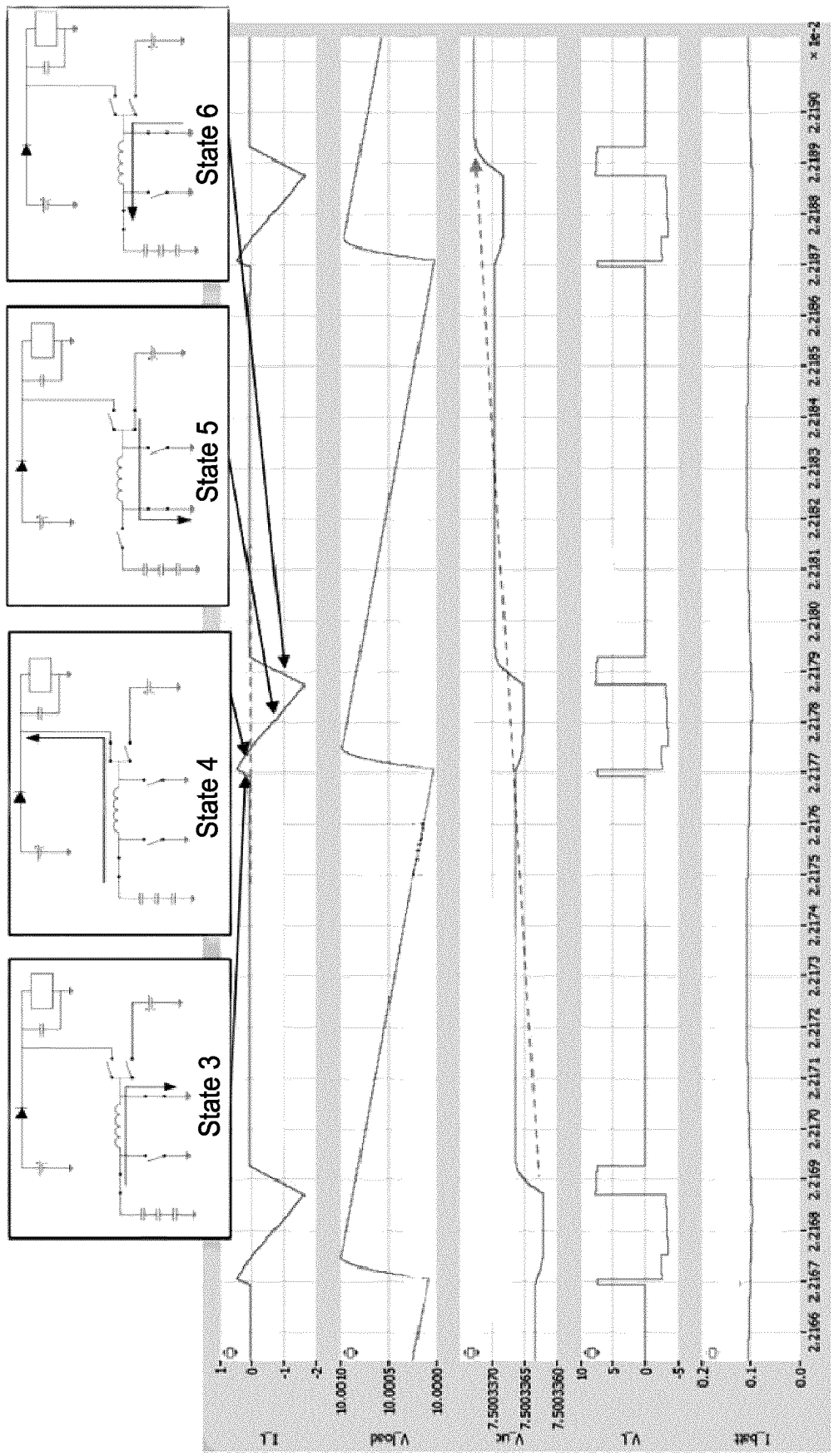
FIG. 17 illustrates a sequence of operation for the second exemplary embodiment of the latch assembly with the multi-port converter in the third state through the sixth state while the main power source is not available according to aspects of the disclosure.
Figure 18:
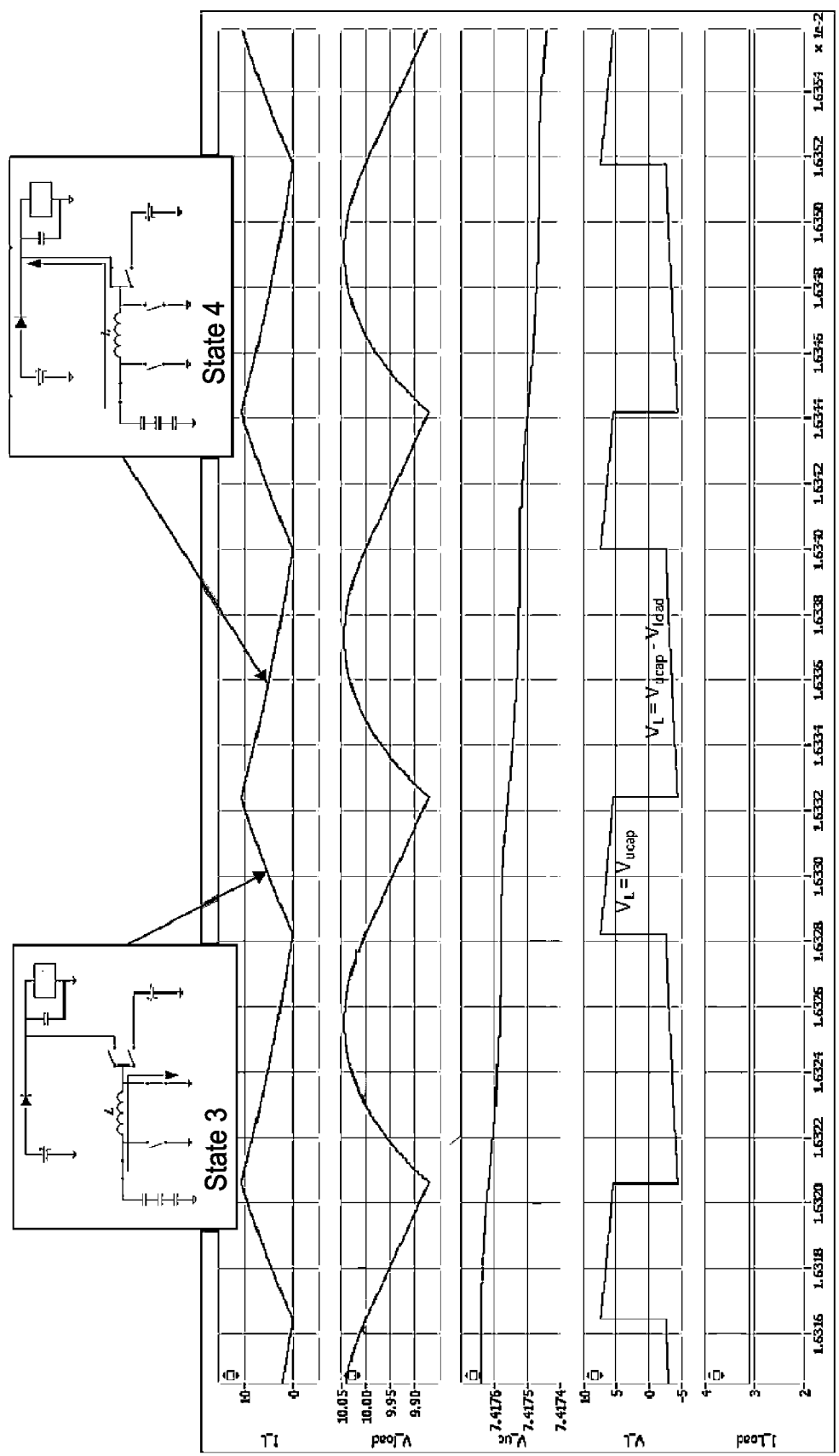
FIG. 18 illustrates a sequence of operation for the second exemplary embodiment of the latch assembly with the multi-port converter in the third state and the fourth state while the main power source is not available during the latch operation according to aspects of the disclosure.

As best shown in FIG. 17, when the main power source 4 is not available and the latch controller 21 is operating in the failure operating condition, but no latch request is detected, the multi-port converter 130 can repeatedly transition from the third state to the fourth state and to the fifth state, then on to the sixth state. As a result, the second backup energy source 26 charges the first backup energy source 24, which in turn charges Vload across the load link capacitor 142 to provide voltage at the latch or load (latch electric motor 9) until both the first backup energy source 24 and Vload are fully charged. In steady state, Vload is regulated at approximately 10 volts with small ripple from quiescent current and in each cycle, energy from the first backup energy source 24 is used to regulate Vload at 10 volts, but the second backup energy source provides a net charge into the first backup energy source 24. FIG. 17 also shows an average 100 milliampere continuous current from the second backup energy source 26. Then, as best shown in FIG. 18, when the main power source 4 is not available and the latch controller 21 is operating in the failure operating condition, and a latch request is detected for example detected by the motor controller 128, the multi-port converter 130 can repeatedly transition from the third state to the fourth state and to the fifth state. Thus, the multi-port converter 130 focuses solely on regulating Vload to the active level (approximately 10 volts) by exclusively taking energy from the first backup energy source 24. So, as shown, Vload is regulated at 10 volts from the first backup energy source 24 during the latch event and the first backup energy source 24 is discharged (shown by the reduction of the voltage of the first backup energy source 24 Vuc) during each cycle to keep Vload regulated. The instantaneous load current I_load is also shown during the latching event. FIG. 25 illustrates a state of the first exemplary embodiment of the latch assembly 1, in accordance with an illustrative embodiment, for example when the main power source 4 is not available and the latch controller 21 is operating in the failure mode, and the latch controller 21 has detected a latch request and the latch controller 21 has been configured to close the first back up connect switch 94 to supply the latch electric motor 9 with energy from the first backup energy source 24, and configured to then open the first back up connect switch 94 in response to detecting the latch event having completed and return to charging the first back up energy source 24 using the second boost converter 30 operating in a boost mode using energy from the second backup energy source 26. So, at the point shown, V_DRIVER has a voltage of 1.71V, the first backup energy source 24 has a voltage (V_SC or SC Voltage) of 7.25 volts for the stack of supercapacitors SC1, SC2, SC3 (with respective voltages of 2.43V, 2.31V, and 2.51V) and an ESR of 0.055 (per each of the supercapacitors, SC1, SC2, SC3) and is being charged by the second backup energy source, which has a voltage (LIB Voltage) of 3.92 volts. The latch operation begins and, at rest, the controller 21, 23 waits for the voltage (V_SC or SC Voltage) of the first backup energy source 24 to drop and then charges the first backup energy source 24 from the second backup energy source 26. Next, at rest, the controller 21, 23 waits for the voltage (V_SC or SC Voltage) of the first backup energy source 24 to drop and then charges the first backup energy source 24 from V_DRIVER followed by waiting and monitoring by the controller 21, 23. Then, charging the first backup energy source 24 from V_DRIVER. The voltages V_SC, V_DRIVER, and LIB Voltage are again shown over time. FIG. 26 illustrates a corresponding state of the first exemplary embodiment of the latch assembly 1, in accordance with an illustrative embodiment, for example when the main power source 4 is not available and the latch controller 21 is operating in the failure mode. So, at the point shown, the first backup energy source 24 has a voltage (V_SC or SC Voltage) of 7.45 volts for the stack of supercapacitors SC1, SC2, SC3 (with respective voltages of 2.49V, 2.35V, and 2.63V) and an ESR of 0.055 (per each of the supercapacitors, SC1, SC2, SC3), the second backup energy source 26 has a voltage (LIB Voltage) of 4.00 volts, V_DRIVER has a voltage of 1.18V, and the controller 21, 23 is waiting for the voltage (V_SC or SC Voltage) of the first backup energy source 24 to drop. The controller 21, 23 then charges the first backup energy source 24 from the second backup energy source 26. The latch operation begins and, at rest, the controller 21, 23 waits for the voltage (V_SC or SC Voltage) of the first backup energy source 24 to drop and then charges the first backup energy source 24 from the second backup energy source 26. Next, at rest, the controller 21, 23 waits for the voltage (V_SC or SC Voltage) of the first backup energy source 24 to drop and then charges the first backup energy source 24 from V_DRIVER followed by waiting and monitoring by the controller 21, 23. Then, charging the first backup energy source 24 from V_DRIVER. The voltages V_SC, V_DRIVER, and LIB Voltage are again shown over time.

Figure 19:
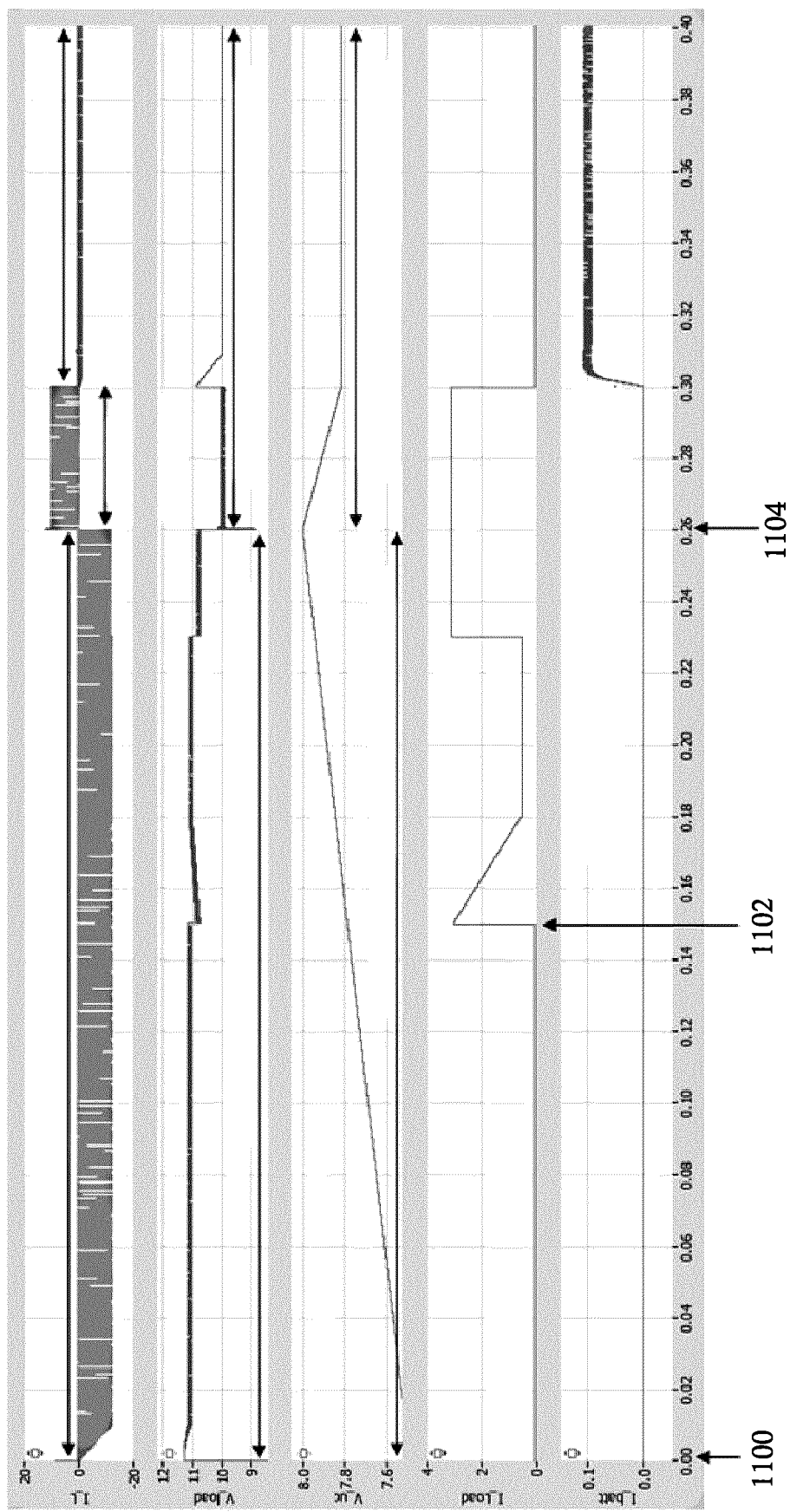
FIGS. 19 and 20 illustrates a sequence of operation for the second exemplary embodiment of the latch assembly showing closed loop operation according to aspects of the disclosure.
Figure 20:
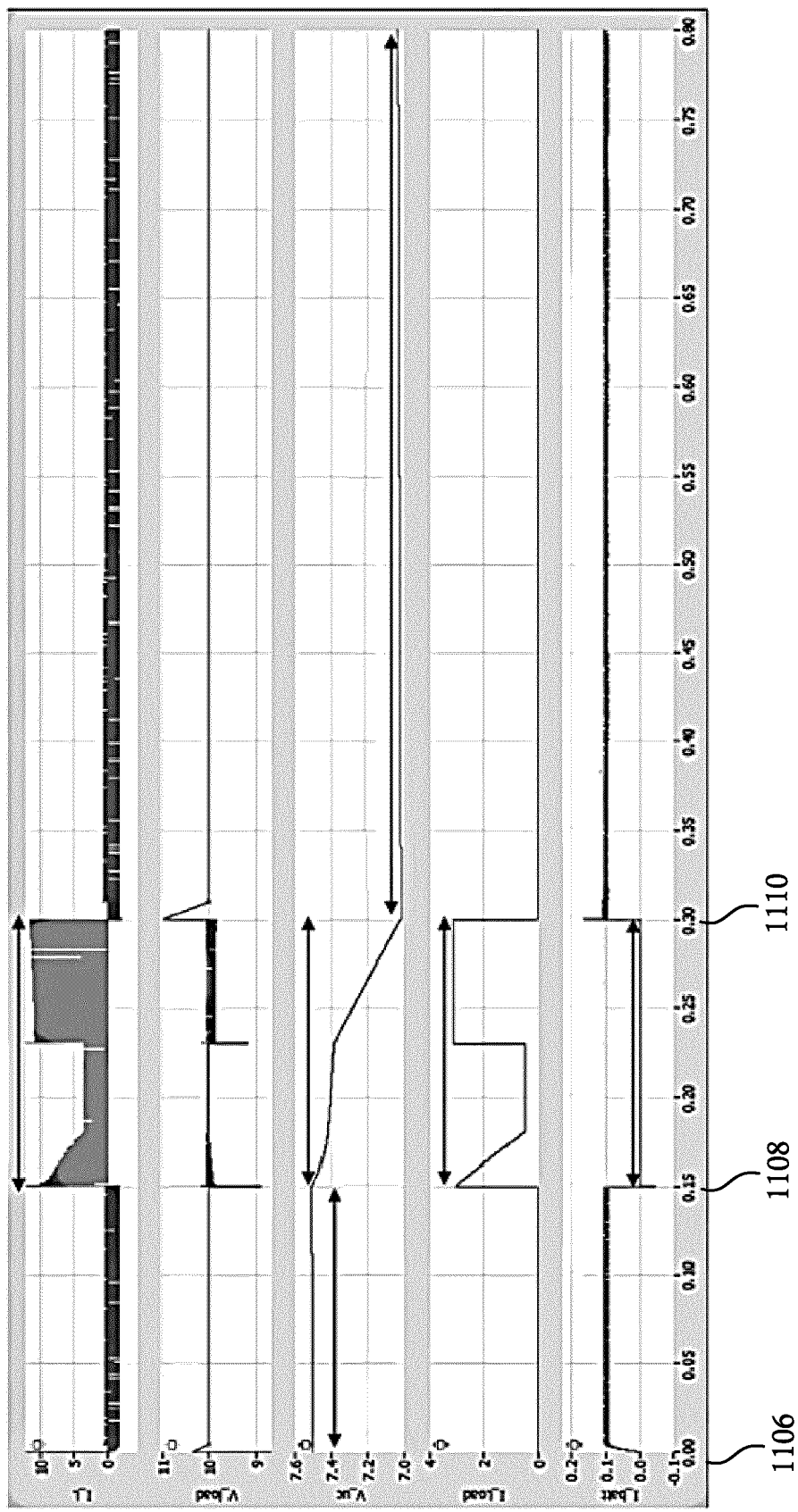

The closed loop operation of the latch controller 21 and the multi-port converter 130 can be seen in FIGS. 19 and 20. Specifically, in FIG. 19, the latch controller 21, for example the boost controller 23, monitors the status of the main power source 4 (e.g., at 0 seconds indicated at 1100, the main power source 4 is present and is removed or unavailable at 0.26 seconds) and whether the latch electric motor 9 is activated (e.g., whether there has been a latch request or a completed latch operation), the voltage across the load link capacitor 142 (V_load), voltage of the first backup energy source 24 (V_uc), and the average current and state of charge of the second backup energy source 26 and reacts accordingly and at a time of 0.15 seconds indicated at 1102, the latch event begins. As shown, the current of the boost inductor 132 (I_L) is negative for a period of time (e.g., clamped at −10 amperes) while the first backup energy source 24 is charged from the voltage available from the load link capacitor 142 (V_load), while the main power source 4 is available (e.g., until 0.26 seconds as shown at 1104). During this period of time, the voltage across the load link capacitor 142 (V_load) is regulated to a voltage of the main power source 4 minus a voltage drop across the main power diode 144. Once the main power source 4 becomes unavailable, the current of the boost inductor (I_L) is positive while the first backup energy source 24 charges the load link capacitor 142 (V_load), as shown in FIGS. 19 and 20. In addition, in FIG. 20, when the main power source 4 is not available for the full duration of the latch event, the current in the boost inductor 132 (I_L) is shown regulating V_load during the latch event. The first backup energy source 24 is discharged during the latch event, and the mutli-port converter 130 is dedicated to regulating V_load during the latch event. Specifically, when the main power source 4 is unavailable (e.g., at 0.26 seconds), the first backup energy source 24 is discharged to regulate the voltage of the load link capacitor (V_load) to approximately 10 volts. Before the latch event (between the times indicated as 1106 and 1108) and once the latching is complete (at the time indicated as 1110), the second backup energy source 26 is used to charge the first backup energy source 24, as shown by the 100 milliampere I_batt current. Thus, the current of the boost inductor 132 (I_L) goes back to a small negative current while the second backup energy source 26 charges the first backup energy source 24.

Figure 21:
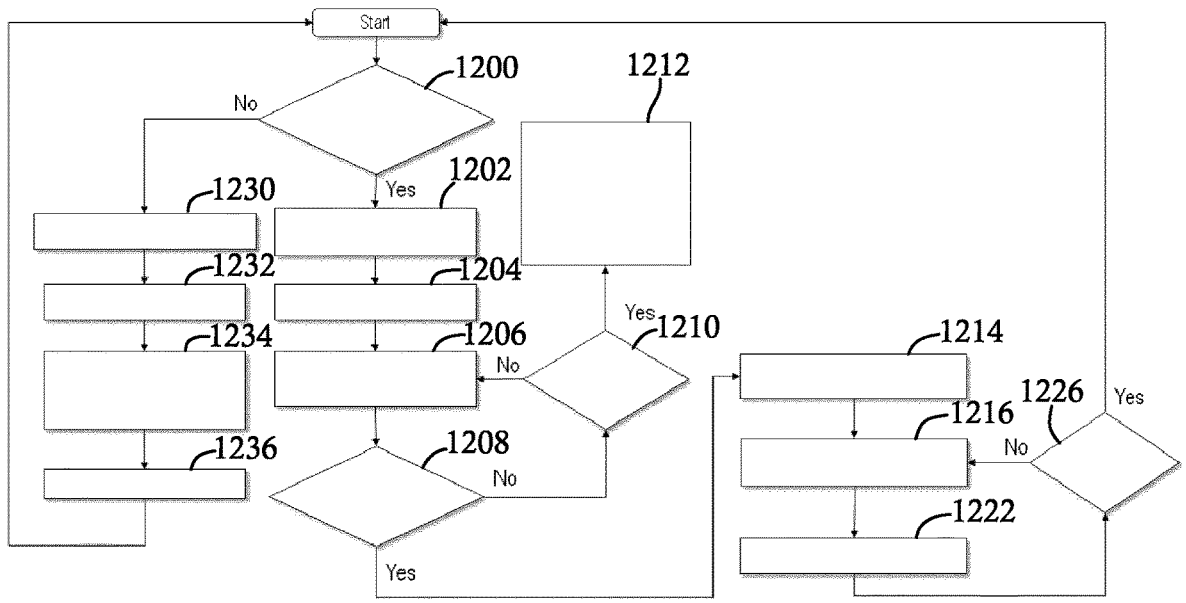
FIG. 21 illustrates steps of a method of operating the latch assembly of the closure panel of the motor vehicle according to aspects of the disclosure.

As best shown in FIG. 21, there is illustrated a method of operating a latch assembly 1, 1' of a closure panel is provided. The method includes the step of 1200 detecting whether there is one of a normal operating condition wherein a main power source 4 is available and a failure operating condition wherein the main power source 4 is not available. If a failure operating condition wherein the main power source 4 is not available is detected at step 1200, the next step of the method is 1202 disconnecting a first backup energy source 24 from a second boost converter 32 in response to detecting the failure operating condition. Next, 1204 connecting a second backup energy source 26 to a first boost converter 30. The method continues by 1206 maintaining the first backup energy source 24 at a partial charge using the first boost converter 30 that is charging the first backup energy source 24 to an intermediate voltage level lower than a full charge using energy from the second backup energy source 26. The next step of the method is 1208 detecting a latch request. The method also includes the step of 1210 determining whether a predetermined period of time has elapsed in response to not detecting a latch request. Then, the method continues by 1212 disconnecting the second backup energy source 26 from the first boost converter 30 to implement a deep sleep mode in response to the predetermined period of time being elapsed, and may include shutting down latch controller 21, boost controller 23, or transitioning latch controller 21, and boost controller 23 to a deep sleep state until the main vehicle battery or another backup energy source is connected and the latch controller 21, boost controller 23 to awake from the latch controller 21, boost controller 23 from the shut down state or deep sleep state.

The method proceeds with the step of 1214, in response to detecting a latch request, disconnecting the first boost converter 30 from the second backup energy source 26 and connecting the first backup energy source 24 to the the second boost converter 32. The method also includes the step of 1216 regulating the voltage level of Vdriver or Vload, for example regulating Vdriver to a full charge voltage, for example 10 Volts for a latch event. The method continues with the steps of 1222 controlling the at least one actuation group 6' to carry out the latch request. The method also includes the step of 1226 detecting a completed latch operation, and returning to step the step of 1216 regulating the voltage level of Vdriver in response to the latch operation not completed.

If a failure operating condition wherein the main power source 4 is not available is not detected at step 1200, the next step of the method is 1230 disconnecting the first boost converter 30 from the second backup energy source 26 to converse the energy of the second backup energy source 26, for example to prevent leakage current. The method then includes the step of 1232 connecting the first backup energy source 24 to the a second boost converter 32, and at step 1234, maintaining the first backup energy source 24 at a partial charge using the second boost converter 32, for example using the second boost converter 32 in a buck mode with negative current. The method then includes the step of 1236 measuring the equivalent series resistance (ESR) of the first backup energy source 24, such as a supercapacitor, during charging of the first backup energy source 24, such as a supercapacitor. At step 1236 of the ESR measurement, the controller, for example controller 21, 23 waits until first backup energy source 24 is fully charged to a predefined set upper threshold, then controller 21, 23 determines the ESR measurement by controlling and detecting a small discharge pulse (opposite direction in current) from the first backup energy source 24 in order to monitor the voltage of drop off the first backup energy source 24 in response to the small discharge pulse. Such a monitored voltage drop may be used by the then controller 21, 23 to calculate the ESR.

Figure 22:
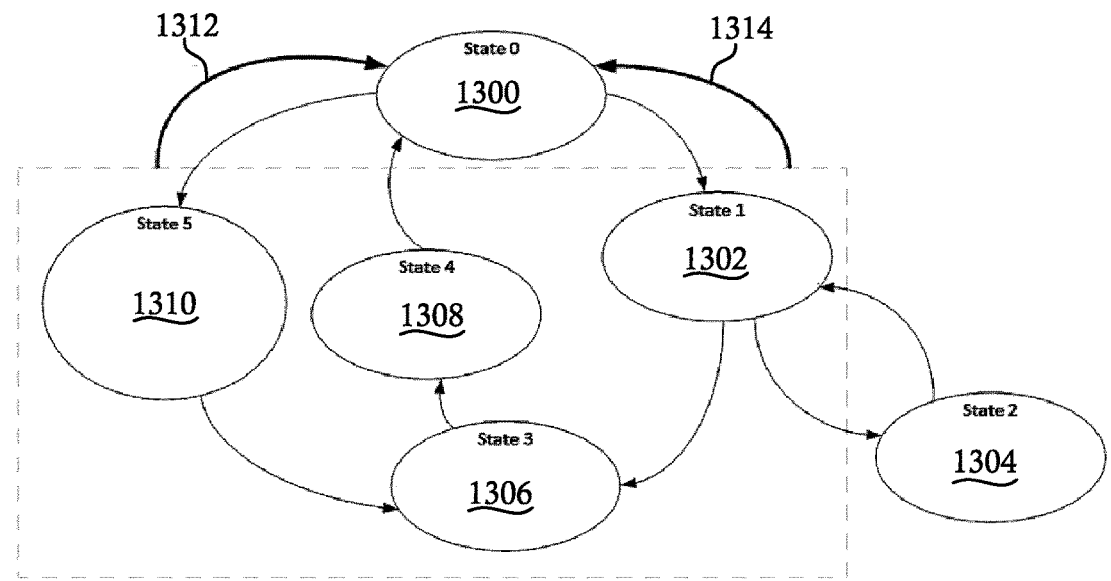
FIG. 22 illustrates a state diagram showing the behavior of a boost controller of the latch assembly according to aspects of the disclosure.

FIG. 22 illustrates a state diagram showing the behavior of the boost controller 21 (or boost controller 23) of the latch assembly 1, 1'. In an initial state or status 1300 (indicated as "State 0" in FIG. 22), the latch controller 21 initializes and determines whether the main power source 4 is available or whether there is failure or interruption of the power from the main power source 4.

In response to determining that the main power source 4 is not available (e.g., car battery is not present), the latch controller 21 can transition from the initial status 1300 to a first status 1302 (indicated as "State 1" in FIG. 22) in which the latch controller 21 (or boost controller 23) controls the first boost converter 30 to charge the first backup energy source 24 to the upper voltage threshold level, such as an intermediate voltage level using energy from the second backup energy source 26. The second boost converter 32 is not operated in the first status 1302.

After determining that the first backup energy source 24 is charged to the upper voltage threshold level, such as the intermediate voltage level and detecting a latch request, the latch controller 21 can transition from the first status 1302 to a second status 1304 (indicated as "State 2" in FIG. 22). In the second status 1304, the latch controller 21 regulates the voltage level of Vdriver or Vload, controls the operation of the second boost converter 32 (e.g., using proportional integral (PI) control) and keeps the first boost converter 30 turned off. Once the latch controller 21 detects a completed latch operation and the voltage level of the first backup energy source 24 being below the "hysteretic window" (e.g., a lower voltage threshold level less than the upper voltage threshold level, such as the intermediate voltage level), the latch controller transitions back to the first status 1302.

From the first status 1302, the latch controller 21 can also transition to a third status 1306 (indicated as "State 3" in FIG. 22) in response to the latch controller 21 to determining that the first backup energy source 24 is charged to the upper voltage threshold level, such as the intermediate voltage level and not detecting a latch request. In the third status 1306, the charge in the first backup energy source 24 (e.g., multiple ultracapacitors or supercapacitors) is balanced.

After determining that the charge in the first backup energy source 24 is balanced, the latch controller 21 transitions from the third status 1306 to a fourth status 1308 (indicated as "State 4" in FIG. 22). In the fourth status 1308, the latch controller 21 (and/or boost controller 23) is transitioned to a deep sleep mode, as also shown in FIGS. 7 and 7A which illustrates a state of the first exemplary embodiment of the latch assembly 1, in accordance with an illustrative embodiment, for example when the main power source 4 is not available and the latch controller 21 is operating in the failure mode, and the latch controller 21 detects an expiration of a predetermined timeout period (e.g., with a timer 1316 shown in FIGS. 26), for example as determined by a counter module or function operated by the controller 21, and then in response opens the second backup switch 92 as illustrated at moment 47 (FIG. 7) of LIB connect switching state diagram disconnect the second back up source backup energy source 26 from the first boost converter 31 circuity, to converse energy from the second back up source backup energy source 26. In response to determining that the charge in the first backup energy source 24 is below the "hysteretic window" (HW), the latch controller transitions from the fourth status 1308 back to the initial status 1300.

While in the initial status 1300, if the latch controller 21 determines that the main power source 4 is available (e.g., car battery is present), the latch controller 21 can transition from the initial status 1300 to a fifth status 1310 (indicated as "State 5" in FIG. 22). In the fifth status 1310, the latch controller 21 (or boost controller 23) controls the second boost converter 32 in a buck mode to charge the first backup energy source 24 to the intermediate voltage level using energy from Vdriver or Vload. The first boost converter 30 is not operated in the fifth status 1310. In addition, the latch controller 21 also measures the equivalent series resistance (ESR) of the of the first backup energy source 24.

In response to the first backup energy source 24 being charged the intermediate voltage level, the latch controller 21 can then transition to the third status 1306 in which the charge in the first backup energy source 24 is balanced. Additionally, while operating within the first status 1302, third status 1306, fourth status 1308, or fifth status 1310, any change in the availability of the main power source 4, shown as 1312, and/or detecting a latch request, shown as 1314, causes the latch controller 21 with the timer 1316 to transition back to the initial status 1300.

In accordance with another illustrative embodiment, the backup energy system 1, 1', may be a distributed system, for a closure panel 2 of a motor vehicle 3. The system 1, 1' includes a motor 9 being movable to actuate a component of the closure panel 2 using power from a main power source 4 during a normal operating condition. The system 1, 1' also includes a first backup energy source 24 selectively coupled to the electric motor 9 and configured to store energy during the normal operating condition and to supply the energy to the latch electric motor 9 during a failure operating condition different from the normal operating condition. In addition, the system 1, 1' includes a second backup energy source 26 configured to supply energy to the first backup energy source 24 during the failure operating condition. A first boost converter 30 is coupled between the second backup energy source 26 and the first backup energy source 24. An electronic control circuit that has a controller 21, 23 is coupled to the first backup energy source 24 and the second backup energy source 26 and the first boost converter 30. The electronic control circuit is configured to detect a actuation request (e.g., latch request), detect whether there is one of the normal operating condition and the failure operating condition, boost a voltage from the second backup energy source 26 to charge the first backup energy source 24 using the first boost converter 30 during the failure operating condition, and couple the first backup energy source 24 to the motor 9 to boost a voltage of the first backup energy source 24 to drive the electric motor 9 in response to detecting the failure operating condition. In accordance with such a system 1, 1', the second backup energy source 26 may be configured to supply energy to the first backup energy source 24, the first backup energy source 24 configured to supply a plurality of components, such as remote components, or the second backup energy source 26 may be configured to supply a plurality of first backup energy sources 24. Each of the plurality of first backup energy sources 24 may include first backup energy source 24 as part of the component.

Also disclosed is latch assembly 1, 1' for a closure panel 2 of a motor vehicle 3 comprising: a latch electric motor 9 being movable to latch and unlatch the closure panel 2 using power from a main power source 4 during a normal operating condition; a first backup energy source 24 selectively coupled to the latch electric motor 9 and configured to store energy during the normal operating condition and to supply the energy to the latch electric motor 9 during a failure operating condition different from the normal operating condition; a second backup energy source 26 configured to supply energy to the first backup energy source 24 during the failure operating condition; an electronic control circuit 10 having a latch controller 21 coupled to the first backup energy source 24 and the second backup energy source 26 and configured to: detect whether there is one of the normal operating condition and the failure operating condition; disconnect the second backup energy source 26 from the first backup energy source 24 during normal operating condition to conserve energy stored in the second backup energy source 26; connect the second backup energy source 26 to the first backup energy source 24 in response to detecting the failure operating condition.

According to an aspect, the latch assembly 1, 1', further comprises: a first boost converter 30 coupled between the second backup energy source 26 and the first backup energy source 24; the latch controller 21 further configured to: detect a latch request, boost a voltage from the second backup energy source 26 to charge the first backup energy source 24 using the first boost converter 30 during the failure operating condition, and couple the first backup energy source 24 to the latch electric motor 9 to boost a voltage of the first backup energy source 24 to drive the latch electric motor 9 in response to detecting the latch request.

According to an aspect, the latch controller 21 is further configured to boost the voltage from the second backup energy source 26 to charge the first backup energy source 24 to an upper voltage threshold level using the first boost converter 30.

According to an aspect, the latch controller 21 is further configured to decouple the first backup energy source 24 from the latch electric motor 9 in response to detecting a completed latch operation.

According to an aspect, the first boost converter 30 includes a first inductor 72 coupled between a second backup positive terminal 74 and the second backup energy source 26 and a first boost node 76 and a first boost switch 78 coupled between the first boost node 76 and an electrical ground 80.

According to an aspect, the latch assembly 1, 1' further includes a second boost converter 32 coupled to the latch controller 21 and the latch controller 21 is further configured to boost a voltage from the first backup energy source 24 to an active voltage level in response to the latch request.

According to an aspect, the second boost converter 32 includes a second inductor 84 coupled between a first backup positive terminal of the first backup energy source 24 and a second boost node and a second boost switch coupled between the second boost node and an electrical ground 80 and the second boost node coupled to the latch electric motor 9.

According to an aspect, the latch assembly 1, 1' further includes a second backup switch 92 coupled between the second backup energy source 26 and a first inductor 72 and controlled by the latch controller 21 for coupling and decoupling the second backup energy source 26 from the first backup energy source 24 and a first backup switch 94 coupled between the first backup energy source 24 and the second inductor 84 and controlled by the latch controller 21 for coupling and decoupling the first backup energy source 24 from the latch electric motor 9.

According to an aspect, the latch assembly 1, 1' further includes a bus capacitor 98 connected in parallel with the latch electric motor 9 and a parallel capacitor 100 in parallel with the main power source 4 and a clamp 102 in parallel with the main power source 4.

According to an aspect, the latch assembly 1, 1' further includes a Schottky diode 104 having an anode connected to a main positive terminal 108 of the main power source 4 and a cathode connected to the latch electric motor 9.

According to an aspect, the latch assembly 1, 1' further includes a buck switch coupled to a main positive terminal 108 of the main power source 4 and to the second inductor 84 and controlled by the latch controller 21 to reduce a battery voltage from the main power source 4 to charge the first backup energy source 24.

According to an aspect, the latch assembly 1, 1' further includes a supply diode 119 and a supply resistor 110 connected between a first backup positive terminal 86 of the first backup energy source 24 and a supply node 112 and a low dropout regulator 114 coupled to the supply node 112 and to the latch controller 21 and a supply capacitor 116 is coupled between the supply node 112 and an electrical ground 80.

According to an aspect, the latch assembly 1, 1' further includes a bridge driver 122 including a bridge input 120 coupled to the latch controller 21 and a supply input 122 coupled to the supply node 112 and a first bridge output 126 coupled to the buck switch 106 and a second bridge output 126 coupled to the second boost switch 90.

According to an aspect, the first boost converter 30 and the second boost converter 32 comprise a multi-port converter 130 including: a boost inductor 132 having a first boost inductor terminal 134 coupled to a first backup positive node 86 of the first backup energy source 24 and a second boost inductor terminal 136 coupled to a second backup positive node 74 of the second backup energy source 26; a first boost switch 78 coupled between the second boost inductor terminal 136 of the boost inductor 132 and an electrical ground 80 and controlled by the latch controller 21; and a second boost switch 90 coupled between the first boost inductor terminal 134 of the boost inductor 132 and the electrical ground 80 and controlled by the latch controller 21.

According to an aspect, the multi-port converter 130 further includes: a first backup switch 94 coupled between the first backup positive node 86 and the first boost inductor terminal 134 and controlled by the latch controller 21 for coupling and decoupling the first backup energy source 24; and a second backup switch 92 coupled between the second backup positive node 74 and the second boost inductor terminal 136 and controlled by the latch controller 21 for coupling and decoupling the second backup energy source 26.

According to an aspect, the multi-port converter 130 further includes a motor and battery connect switch 138 coupled between the second boost inductor terminal 136 and a shared node 140 coupled to a positive battery terminal 108 of the main power source 4 and to the latch electric motor 9 and controlled by the latch controller 21 for coupling and decoupling both the main power source 4 and the latch electric motor 9 from the first boost converter 30 and second boost converter 32.

According to an aspect, the latch assembly 1, 1' further includes a load link capacitor 142 connected in parallel with the latch electric motor 9.

According to an aspect, the latch controller 21 is further configured to: close the motor and battery connect switch 138 and the second boost switch 90 and open the first backup switch 94 and the first boost switch 78 and the second backup switch 92 to store energy in the boost inductor 132 from the main power source 4 in a first state; close the first boost switch 78 and the first backup switch 94 and open the second boost switch 90 and the second backup switch 92 and the motor and battery connect switch 138 to charge the first backup energy source 24 using energy stored in the boost inductor 132 in a second state; close the first backup switch 94 and the first boost switch 78 and open the second backup switch 92 and the motor and battery connect switch 138 and the second boost switch 90 to store energy in the boost inductor 132 from the first backup energy source 24 in a third state; close the first backup switch 94 and the motor and battery connect switch 138 and open the first boost switch 78 and the second boost switch 90 and the second backup switch 92 to charge the load link capacitor 142 using stored energy from the first backup energy source 24 in a fourth state; close the second backup switch 92 and the second boost switch 90 and open the first backup switch 94 and the first boost switch 78 and the motor and battery connect switch 138 to store energy in the boost inductor 132 from the second backup energy source 26 in a fifth state; and close the first boost switch 78 and the first backup switch 94 and open the second boost switch 90 and the second backup switch 92 and the motor and battery connect switch 138 to charge the first backup energy source 24 using energy stored in the boost inductor 132 in a sixth state.

Also provided is a method of operating a latch assembly 1, 1' of a closure panel 2, comprising the steps of: detecting whether there is one of a normal operating condition wherein a main power source 4 is available and a failure operating condition wherein the main power source 4 is not available; disconnecting a first backup energy source 24 from at least one actuation group 6' being movable to latch and unlatch the closure panel in response to detecting the failure operating condition; connecting a second backup energy source 26 to the first backup energy source 24 in response to detecting the failure operating condition to maintain the voltage of the first backup energy source within a predetermined voltage range.

According to an aspect, the method further includes the step of charging the first backup energy source 24 to an upper voltage level of the predetermined voltage range in response to detecting first backup energy source 24 voltage at or below a lower voltage level of the predetermined voltage range.

According to an aspect, the method further includes the steps of: connecting the first backup energy source 24 to the main power source 4 in response to detecting the normal operating condition to charge the first backup energy source 24 to an upper voltage level in response to detecting the first backup energy source 24 voltage at or below a lower voltage level to maintain the voltage of the first backup energy source within a predetermined voltage range using energy from the main power source 4.

According to an aspect, the first backup energy source 24 is charged during the normal operating condition to the upper voltage level that is higher than the upper voltage level the first backup energy source 24 is charged to during the failure operating condition.

According to an aspect, the method further includes the steps of: detecting a latch request; connecting the first backup energy source 24 to at least one actuation group 6' in response to detecting the latch request; controlling the at least one actuation group 6' to carry out the latch request; detecting a completed latch operation; disconnecting the first backup energy source 24 from the at least one actuation group 6; charging the first backup energy source 24 using a second backup energy source 26 to maintain the voltage of the first backup energy source within the predetermined voltage range in response to detecting the completed latch operation.

According to an aspect, the method further includes the steps of: connecting the second backup energy source 26 to a first boost converter 30; connecting the first boost converter 30 to the first backup energy source 24 to charge the first backup energy source 24 to maintain the voltage of the first backup energy source within the predetermined voltage range using energy from the second backup energy source 26; connecting the first boost converter 30 to the second backup energy source 26 to charge the first backup energy source 24 in response to detecting the latch request; connecting the first backup energy source 24 to a second boost converter 32; connecting the second boost converter 32 to the at least one actuation group 6'; controlling the at least one actuation group 6' to carry out the latch request; detecting a completed latch operation; disconnecting the first backup energy source 24 from the second boost converter 32 in response to detecting the completed latch operation; connecting the first boost converter 30 to the first backup energy source 24 to maintain the voltage of the first backup energy source 24 within a predetermined voltage range using energy from the second backup energy source 26 in response to detecting the completed latch operation.

According to an aspect, the method further includes the steps of: determining whether a predetermined period of time has elapsed in response to one of not detecting a latch request and detecting the failure operating condition; and disconnecting the second backup energy source 26 from the first backup energy source 24 to implement a deep sleep mode in response to the predetermined period of time being elapsed.

According to an aspect, the method further includes the step of waking from the deep sleep mode in response to detecting a normal operating condition.

Also provided is a method of operating a latch assembly 1, 1' of a closure panel 2, comprising the steps of: detecting whether there is one of a normal operating condition wherein a main power source is available and a failure operating condition wherein the main power source 4 is not available; connecting a second backup energy source 26 to a first backup energy source 24 in response to detecting the failure operating condition to maintain the voltage of the first backup energy source within a predetermined voltage range; detecting a latch request; determining whether a predetermined period of time has elapsed in response to one of not detecting the latch request and detecting the failure operating condition; and disconnecting the second backup energy source 26 from the first backup energy source 24 to implement a deep sleep mode in response to the predetermined period of time being elapsed.

Also provided is a latch assembly 1, 1' for a closure panel 2 of a motor vehicle 3, comprising: at least one actuation group 6' being movable to latch and unlatch the closure panel 2 using power from a main power source during a normal operating condition; a first backup energy source 24 selectively coupled to the at least one actuation group 6' and configured to store energy during the normal operating condition and to supply the energy to the at least one actuation group 6' during a failure operating condition different from the normal operating condition; a second backup energy source 26 selectively coupled to the first backup energy source 24 and configured to supply energy to the first backup energy source 24 during the failure operating condition; an electronic control circuit 10 having a latch controller 21 coupled to the at least one actuation group 6' and to the first backup energy source 24 and the second backup energy source 26, and configured to: detect whether there is one of the normal operating condition and the failure operating condition; determining whether a predetermined period of time has elapsed after detecting the failure operating condition; and disconnect the second backup energy source 26 from the first backup energy source 24 to implement a deep sleep mode in response to the predetermined period of time being elapsed.

According to an aspect, the latch controller 21 is further configured to connect the second backup energy source 26 with the first backup energy source 24 in response to detecting the failure operating condition.

According to an aspect, the latch controller 21 is further configured to detect the normal operating condition subsequent to implementing the deep sleep mode; and reconnect the second backup energy source 26 with the first backup energy source subsequent to detecting the normal operating condition.

According to an aspect, the latch controller 21 is further configured to: detect one of a latch request and a completed latch operation; connect a first boost converter 30 to a first backup energy source 24 to charge the first backup energy source 24 using energy from the second backup energy source 26 in response to detecting one of the latch request and the completed latch operation; determine whether the predetermined period of time has elapsed; return to the step of connecting the first boost converter 30 to the first backup energy source 24 to charge the first backup energy source 24 using energy from the second backup energy source 26 in response to the predetermined period of time not being elapsed; and disconnect the second backup energy source 26 from the first boost converter 30 to implement the deep sleep mode in response to the predetermined period of time being elapsed.

According to an aspect, the latch controller 21 includes a motor controller 128 coupled to the at least one actuation group 6' and a boost controller 23 coupled to the first backup energy source 24 and the second backup energy source 26, and the boost controller 23 is configured to: detect whether there is one of the normal operating condition and the failure operating condition; detect one of a latch request and a completed latch operation in the failure operating condition; charge the first backup energy source 24 using energy from the second backup energy source 26 based on the detection of the one of the latch request and the completed latch operation and the failure operating condition.

According to an aspect, the motor controller 128 is configured to operate in a non-powered condition when in the failure operating condition, and the boost controller is configured to operate in a powered condition when in the failure operating condition.

According to an aspect, the boost controller is configured to receive power from one of the second backup energy source 26 and the first backup energy source 24 in a powered condition.

According to an aspect, the motor controller 128 is in a non-powered condition when in the failure operating condition and is configured to transition to a powered condition using a boosted voltage of the first backup energy source 24 used to drive a latch electric motor 9.

Clearly, changes may be made to what is described and illustrated herein without, however, departing from the scope defined in the accompanying claims. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptions used herein interpreted accordingly.

What is claimed is:

1. A latch assembly for a closure panel of a motor vehicle, comprising:
    at least one actuation group being movable to latch and unlatch the closure panel using power from a main power source during a normal operating condition;
    a first backup energy source selectively coupled to the at least one actuation group and configured to store energy during the normal operating condition and to supply the energy to the at least one actuation group during a failure operating condition different from the normal operating condition;
    a second backup energy source selectively coupled to the first backup energy source and configured to supply energy to the first backup energy source during the failure operating condition; and
    an electronic control circuit having a latch controller coupled to the at least one actuation group and to the first backup energy source and the second backup energy source, and configured to:
        detect whether there is one of the normal operating condition and the failure operating condition; and
        charge the first backup energy source using energy from the second backup energy source based on the detection of the failure operating condition, wherein the first backup energy source is charged to maintain the voltage of the first backup energy source within a predetermined voltage range.

2. The latch assembly as set forth in claim 1, wherein the predetermined voltage range includes an upper voltage threshold level and a lower voltage threshold level, latch controller is further configured to charge the first backup energy source to the upper voltage threshold level in response to detecting the voltage of the first backup energy source at or below the lower voltage threshold level.

3. The latch assembly as set forth in claim 2, wherein the latch controller is further configured to:
charge the first backup energy source using power from the main power source during a normal operating condition, wherein the first backup energy source is charged to the upper voltage threshold level in response to detecting the voltage of the first backup energy source at or below the lower voltage threshold level to maintain the voltage of the first backup energy source within a predetermined voltage range.

4. The latch assembly as set forth in claim 2, wherein the latch controller is further configured to:
charge the first backup energy source to a full voltage threshold level during the normal operating condition, and charge the first backup energy source to a partial voltage threshold level during the failure operating condition, wherein the partial voltage threshold level is lower than the full voltage threshold level.

5. The latch assembly 1, 1' as set forth in claim 1, wherein the latch controller is further configured to:
disconnect the second backup energy source from the first backup energy source during the normal operating condition to conserve energy stored in the second backup energy source; and
connect the second backup energy source to the first backup energy source in response to detecting the failure operating condition to supply energy to the first backup energy source.

6. The latch assembly as set forth in claim 5, further including a second backup switch coupled between the second backup energy source and the first backup energy source and controlled by the latch controller for coupling and decoupling the second backup energy source 26 from the first backup energy source.

7. The latch assembly as set forth in claim 5, wherein the latch controller is further configured to disconnect the second backup energy source from the first backup energy source after a predetermined period of time following detecting the failure operating condition.

8. The latch assembly as set forth in claim 5, wherein the latch controller is further configured to connect the first backup energy source to the at least one actuation group in response to detecting a latch request.

9. The latch assembly as set forth in claim 8, wherein the latch controller is further configured to disconnect the first backup energy source from the at least one actuation group in response to detecting a completed latch operation.

10. The latch assembly as set forth in claim 1, wherein the latch controller is further configured to:
connect the first backup energy source to the main power source during the normal operating condition to charge the first backup energy source using power from the main power source; and
disconnect the first backup energy source from the main power source in response to detecting the failure operating condition.

11. The latch assembly as set forth in claim 10, further including a first backup switch coupled between the first backup energy source and the main vehicle battery and controlled by the latch controller for coupling and decoupling the first backup energy source from at least one of the main vehicle battery and the at least one actuation group.

* * * * *